United States Patent
Wang et al.

(10) Patent No.: US 11,988,471 B2
(45) Date of Patent: May 21, 2024

(54) DEVICES AND METHODS FOR FABRICATION OF COMPONENTS OF A MULTISCALE POROUS HIGH-TEMPERATURE HEAT EXCHANGER

(71) Applicants: Massachusetts Institute of Technology, Cambridge, MA (US); Purdue Research Foundation, West Lafayette, IN (US)

(72) Inventors: Evelyn N. Wang, Cambridge, MA (US); Lin Zhao, Revere, MA (US); Bikram Bhatia, Cambridge, MA (US); Xiangyu Li, Cambridge, MA (US); Arny Leroy, Montreal (CA); Kyle Wilke, Boston, MA (US); Lenan Zhang, Cambridge, MA (US); Jeffrey Youngblood, Crawfordsville, IN (US); Rodney Trice, Xenia, OH (US); Chad T. Wilson, Cambridge, MA (US); Olivia Brandt, West Lafayette, IN (US); Rodrigo Orta Guerra, West Lafayette, IN (US)

(73) Assignees: Massachusetts Institute of Technology, Cambridge, MA (US); Purdue Research Foundation, West Lafayette, IN (US)

(*) Notice: Subject to any disclaimer, the term of this patent is extended or adjusted under 35 U.S.C. 154(b) by 0 days.

(21) Appl. No.: 17/705,693

(22) Filed: Mar. 28, 2022

(65) Prior Publication Data
US 2022/0307778 A1    Sep. 29, 2022

Related U.S. Application Data

(60) Provisional application No. 63/166,973, filed on Mar. 27, 2021.

(51) Int. Cl.
  F28F 9/02     (2006.01)
  F28D 9/00     (2006.01)
  F28F 21/04    (2006.01)

(52) U.S. Cl.
  CPC .............. *F28F 9/02* (2013.01); *F28D 9/0062* (2013.01); *F28F 21/04* (2013.01)

(58) Field of Classification Search
  CPC .......... F28F 2260/02; F28F 9/02; F28F 21/04; F28D 9/0062
  See application file for complete search history.

(56) References Cited

U.S. PATENT DOCUMENTS 4,174,987 A * 11/1979 Belvin ................ B31D 3/02
                                                    156/290
5,505,256 A *  4/1996 Boardman .......... B21D 53/045
                                                    165/166

(Continued)

OTHER PUBLICATIONS

Li et al., "Design and Modeling of a Multiscale Porous Ceramic Heat Exchanger for High-Temperature Applications with Ultrahigh Power Density," International Journal of Heat and Mass Transfer 194 (2022) 122996.

(Continued)

*Primary Examiner* — Raheena R Malik
(74) *Attorney, Agent, or Firm* — Barnes & Thornburg LLP

(57) ABSTRACT

Devices and methods for fabrication of a multiscale porous high-temperature heat exchanger for high-temperature and high-pressure applications are disclosed. The heat exchanger can include a core with macrochannels formed in a checkerboard pattern to facilitate alternative flow of working fluid having hot and cold temperatures between adjacent macrochannels. Each macrochannel can include a two-dimensional microchannel array that further distributes flow throughout the heat exchanger to enhance heat transfer and (Continued)

mechanical strength without significant pressure drop penalty. The heat exchanger can further include a header integrated therewith to distribute working fluid flowing through the heat exchanger through the outlets such that it flows evenly therethrough. Methods of fabricating heat exchangers of this nature are also disclosed.

21 Claims, 11 Drawing Sheets

(56) References Cited

U.S. PATENT DOCUMENTS

| | | | | |
|---|---|---|---|---|
| 5,725,051 | A * | 3/1998 | Veltkamp | F28F 21/06 165/165 |
| 6,467,535 | B1 * | 10/2002 | Shembekar | F28D 7/0025 165/165 |
| 6,675,875 | B1 * | 1/2004 | Vafai | H05K 7/20381 174/15.1 |
| 6,688,381 | B2 * | 2/2004 | Pence | H01L 23/473 257/E23.098 |
| 6,942,018 | B2 | 9/2005 | Goodson et al. | |
| 7,011,760 | B2 * | 3/2006 | Wang | C10G 2/332 977/843 |
| 7,014,835 | B2 * | 3/2006 | Mathias | F16L 41/02 423/652 |
| 7,077,191 | B2 * | 7/2006 | Merkle | F28F 3/12 165/47 |
| 7,156,159 | B2 * | 1/2007 | Lovette | H01L 23/473 257/E23.098 |
| 7,272,005 | B2 * | 9/2007 | Campbell | H05K 7/2079 174/15.1 |
| 7,285,153 | B2 * | 10/2007 | Bruun | F28F 7/02 165/DIG. 395 |
| 7,331,381 | B2 * | 2/2008 | Wang | F28F 21/086 165/905 |
| 7,468,202 | B2 * | 12/2008 | Sakamoto | B01D 46/2455 428/116 |
| 7,955,504 | B1 * | 6/2011 | Jovanovic | B01D 63/08 210/321.71 |
| 8,343,473 | B2 | 1/2013 | Youngblood et al. | |
| 8,381,803 | B2 * | 2/2013 | Kim | C01B 3/06 165/166 |
| 8,525,633 | B2 | 9/2013 | Whitney et al. | |
| 8,678,075 | B2 | 3/2014 | Wang et al. | |
| 8,851,156 | B2 * | 10/2014 | Semmes | F28F 19/006 165/165 |
| 8,865,297 | B2 | 10/2014 | Xiao et al. | |
| 9,067,179 | B2 * | 6/2015 | Charest | B01D 63/081 |
| 9,101,890 | B2 * | 8/2015 | Tonkovich | C01B 3/38 |
| 9,180,239 | B2 * | 11/2015 | Borenstein | A61M 1/1698 |
| 9,203,030 | B2 | 12/2015 | Kippelen et al. | |
| 9,296,131 | B2 | 3/2016 | Youngblood et al. | |
| 9,597,441 | B2 * | 3/2017 | Borenstein | B01D 63/085 |
| 9,618,278 | B2 * | 4/2017 | Denkenberger | B21D 53/045 |
| 9,689,631 | B2 | 6/2017 | Xiao et al. | |
| 9,717,835 | B2 * | 8/2017 | Borenstein | B32B 38/18 |
| 9,835,363 | B2 | 12/2017 | Xiao et al. | |
| 9,841,186 | B2 | 12/2017 | Cho et al. | |
| 9,869,188 | B2 | 1/2018 | Brosnan et al. | |
| 9,929,690 | B2 | 3/2018 | Lenert et al. | |
| 10,043,932 | B2 | 8/2018 | Chen et al. | |
| 10,112,271 | B2 * | 10/2018 | Veilleux, Jr. | F28D 7/0066 |
| 10,280,770 | B2 | 5/2019 | Shim et al. | |
| 10,553,522 | B1 * | 2/2020 | Canaperi | F28F 21/089 |
| 10,584,922 | B2 * | 3/2020 | Herring | F28D 7/0008 |
| 10,867,887 | B2 | 12/2020 | Wang et al. | |
| 10,976,120 | B2 * | 4/2021 | Eastman | B29C 43/021 |
| 11,028,019 | B2 | 6/2021 | Youngblood et al. | |
| 11,255,615 | B2 * | 2/2022 | Streeter | F28F 9/0246 |
| 11,598,536 | B2 * | 3/2023 | Kozubal | F24F 5/0021 |
| 2002/0079087 | A1 * | 6/2002 | Vafai | H01L 23/473 257/E23.098 |
| 2002/0144600 | A1 * | 10/2002 | TeGrotenhuis | B01J 19/0093 95/273 |
| 2003/0221554 | A1 * | 12/2003 | TeGrotenhuis | B01J 19/0093 95/45 |
| 2005/0282051 | A1 * | 12/2005 | Zhou | H01M 8/2435 429/479 |
| 2009/0151767 | A1 | 6/2009 | Sharifi et al. | |
| 2012/0247732 | A1 * | 10/2012 | Suzuki | F28D 7/10 165/104.14 |
| 2012/0291991 | A1 * | 11/2012 | Denkenberger | B29C 66/348 156/60 |
| 2013/0102407 | A1 | 4/2013 | Rice et al. | |
| 2015/0132569 | A1 | 5/2015 | Trice et al. | |
| 2015/0375997 | A1 | 12/2015 | Chu et al. | |
| 2016/0176075 | A1 | 6/2016 | Youngblood et al. | |
| 2016/0282061 | A1 * | 9/2016 | Veilleux, Jr. | B22F 5/106 |
| 2016/0347661 | A1 | 12/2016 | Youngblood et al. | |
| 2017/0129135 | A1 | 5/2017 | Youngwood et al. | |
| 2017/0165708 | A1 | 6/2017 | Sivaramakrishnan et al. | |
| 2017/0321077 | A1 | 11/2017 | Ranganathan et al. | |
| 2018/0119270 | A1 | 5/2018 | Hoel et al. | |
| 2018/0340738 | A1 * | 11/2018 | Kozubal | F28D 7/0025 |
| 2019/0100439 | A1 | 4/2019 | Chen et al. | |
| 2019/0113292 | A1 * | 4/2019 | Eastman | B29D 99/0014 |
| 2019/0381600 | A1 | 12/2019 | Sandhage | |
| 2020/0232662 | A1 * | 7/2020 | Kozubal | F24F 5/0021 |
| 2022/0252352 | A1 * | 8/2022 | Iida | F28D 7/0025 |
| 2022/0307778 | A1 * | 9/2022 | Wang | F28F 7/02 |

OTHER PUBLICATIONS

Lu et al., "An Ultrathin Nanoporous Membrane Evaporator" Nano Letters, 17(10), p. 6217-6220, 2017.

Lu et al., "Design and Modeling of Membrane-Based Evaporative Cooling Devices for Thermal Management of High Heat Fluxes," IEEE Transactions on Components, Packaging and Manufacturing Technology, p. 1-10, 2016.

Messing et al., "Templated Grain Growth of Textured Piezoelectric Ceramics," Critical Reviews in Solid State and Materials Sciences, 29 45-96 (2004).

Miljkovic et al., "Jumping-Droplet-Enhanced Condensation on Scalable Superhydrophobic Nanostructured Surfaces," Nano Letters, 13(1), 179-187, 2013.

Moini et al., "Additive manufacturing and characterization of architecture cement-based materials via X-ray microcomputed tomography," in RILEM International Conference on Concrete and Digital Fabrication 2018 (RILEM Book series, vol. 19), Wangler, Flatt eds. 2018, Chap 16. 10.1007/978-3-319-99519-9_16.

Moini et al., "Additive Manufacturing and Performance of Architectured Cement-Based Materials," Advanced Materials 2018, 1802123. DOI: 10.1002/adma.201802123.

Molten Salt Reactor (MSR), GEN IV International Forum https://www.gen-4.org/gif/jcms/c_9359/msr.

Moon et al., "Cellulose Nanomaterials Review: Structure, Properties, and Nanocomposites," Royal Society of Chemistry, Chemical Reviews 2011, 40, 3941-3994. (2608 cites, Googlescholar).

Narayanan et al., "A thermophysical battery for storage-based climate control," Applied Energy, 189, p. 31-43, 2016.

Narayanan et al., "Thermal Battery for Portable Climate Control," Applied Energy, 149, p. 104-116, 2015.

National Minerals Information Center, "Manufactured Abrasives Statistics and Information," <https://minerals.usgs.gov/minerals/pubs/commodity/abrasives/mcs-2017-abras.pdf>.

Pabst et al., "Elasticity of Porous Ceramics—A Critical Study of Modulus-Porosity Relations," J. Eur. Ceram. Soc. 2006, 26 (7), 1085-1097. https://doi.org/10.1016/j.jeurceramsoc.2005.01.041.

Park et al., "Strain-Dependent Electrical Resistance of Multi-Walled Carbon Nanotube/Polyethylene Oxide Composite Films," Nanotechnology, 2008, 19, 055705. (289 cites, Googlescholar).

Penfield, "Compact Heat Exchangers for Nuclear Power Plants," Topical Workshop on new Cross-Cutting Technologies for Nuclear Power Plants, Session 2: Advanced Power Conversion for NPP, <https://energy.mit.edu/wp-content/uploads/2017/02/2-1.-Penfield_Compact-Heat-Exchangersfor-NPPs-170130-min.pdf.>.

(56) References Cited

OTHER PUBLICATIONS

Pickens et al., "Pressureless Sintering of Silicon Nitride/Boron Nitride Laminate Composites," J. Mat. Sci., 40 [8] 2101-2103 (2005).
Preston et al., "Design of Lubricant Infused Surfaces," ACS Applied Materials and Interfaces, 9(48), p. 42383-42392, 2017.
Preston et al., "Gravitationally-driven Wicking for Enhanced Condensation Heat Transfer, " Langmuir, 34(15), 4658-4664, 2018.
Rohlik, "Current and Future Technology in Radial and Axial Gas Turbines," Nasa Technical Memorandum 83414, 1983.
Rolls Royce, XWB, T. The world's most efficient large aero engine. <https://www.rolls-royce.com/products-and-services/civil-aerospace/widebody/trent-xwb.aspx#/>.
Rueschhoff et al., "Additive manufacturing of dense ceramic parts via direct ink writing of aqueous alumina suspensions," International Journal of Applied Ceramic Technology 2016, 13 (5), 821-830. DOI: 10.1111/ijac. 12557.
Rueschhoff et al., "Near-net shaping of silicon nitride via aqueous room-temperature injection molding and pressureless sintering," Ceramics International 2017, 43, 10791-10798. DOI: 10.1016/j.ceramint.2017.05.097.
Rueschhoff et al., "Stabilizing highly loaded silicon nitride aqueous suspensions using comb polymer concrete superplasticizers," Journal of the American Ceramic Society, 2016, 99 (12), 3857-3865. DOI: 10.1111/jace.14432.
Sellenet et al., "Synergistic Activity of Hydrophilic Modification in Antibiotic Polymers," Biomacromolecules 2007, 8 (1), 19-23. (110 cites, Googlescholar).
Singhal, J. Mater. Sci. 11(7), pp. 1246-1253, 1976.
Tan et al., "Rare-earth Modified Zirconium Diboride High Emissivity Coatings for Hypersonic Applications," Journal of European Ceramic Society, 34 1-11 (2014).
Trice et al., "Deformation Mechanisms in Compression Loaded Stand-Alone Plasma-Sprayed Alumina Coatings," J. Am. Ceram. Soc., 83 [12] 3057-64 (2000).
Trice et al., "Influence of Microstructure and Temperature on the Interfacial Fracture Energy of Silicon Nitride/Boron Nitride Fibrous Monolithic Ceramics," J. Am. Ceram. Soc., 82 [9] 2502-8 (1999).
Trice et al., J. Am. Ceram. Soc. 82(11), pp. 2943-2947, 1999.
Trinh, "On the Blasius correlation for friction factors," No. 1932, 2010.
Van Hoy, et al., J. Am. Ceram. Soc. 81(1), pp. 152-158, 1998.
VanEvery et al., "Column Formation in Suspension Plasma-Sprayed Coatings and Resultant Properties," special issue of the J. Therm. Spray Techn., 20 [4] 817-828 (2011).
Very-High-Temperature Reactor (VHTR). GEN IV International Forum https://www.gen-4.org/gif/jcms/c_42153/very-high temperature-reactor-vhtr.
Weiland et al., "Fossil Energy," Fundamentals and Applications of Supecritical Carbon Dioxide (sCO2) Based Power Cycles, Elsevier Ltd. 2017.
Wiesner et al., "Horizontal dip-spin casting of aqueous alumina-polyvinylpyrrolidone suspensions with chopped fiber," International Journal of Applied Ceramic Technology, 1-11. DOI: 10.1111/ijac.12714.
Wiesner et al., "Producing Dense Zirconium Diboride Components by Room-Temperature Injection Molding of Aqueous Ceramic Suspensions," Ceram. Int. 42(2, Part A), pp. 2750-2760, 2016.
Wiesner et al., "Room-temperature injection molding of aqueous alumina-polyvinylpyrrolidone suspensions," Journal of the European Ceramic Society 2014, 34, 453-463.
Withey et al., "Design of 7 wt.% Y2O3-ZrO2/Mullite Plasma-Sprayed Composite Coatings for Increased Creep Resistance," J. Eur. Cer. Soc., 27 4675-4683 (2007).
Xiao et al., "Prediction and Optimization of Liquid Propagation in Micropillar Arrays," Langmuir, 26(19), 15070-15075, 2010.
Youngblood et al., "Ultrahydrophobic Polymer Surfaces Prepared by Simultaneous Ablation of Polypropylene and Sputtering of Poly(tetrafluoroethylene) Using Radio Frequency Plasma," Macromolecules 1999, 20, 6800-6806. (612 cites, Googlescholar).

Zhang et al., "Recent Developments in High Temperature Heat Exchangers: A Review," Front. Heat Mass Transf. 2018, 11. https://doi.org/10.5098/hmt.11.18.
Zhou et al., "Recyclable Organic Solar Cells on Cellulose Nanocrystal Substrates," Scientific Reports 2013, 3:1536. (208 cites, Googlescholar).
Zhu et al., "Prediction and Characterization of Dry-out Heat Flux in Micropillar Wick Structures," Langmuir, 32(7), p. 1920-1927, 2016.
Zhu et al., "Suppressing High-frequency Temperature Oscillations in Microchannels with Surface Structures," Applied Physics Letters, 110(3), p. 033501, 2017.
Zhu et al., "Surface Structure Enhanced Microchannel Flow Boiling," Journal of Heat Transfer, 138(8), 091501, 2016.
"Pressure Loss from Fittings—Expansion and Reduction in Pipe Size," Neutrium, 2012. [Online]. Available: https://neutrium.net/fluid-flow/pressure-loss-from-fittings-expansion-and-reduction-in-pipe-size/. [Accessed: Jan. 1, 2021].
Acosta et al., "Effect of Polyvinylpyrrolidone Additions on the Rheology of Aqueous, Highly Loaded Alumina Suspensions," J. American Ceramic Society, 2013, 1-11.
Adera et al., "Design of Micropillar Wicks for Thin-film Evaporation," International Journal of Heat and Mass Transfer, 101, p. 280-294, 2016.
Adera et al., "Hotspot Thermal Management via Thin-Film Evaporation—Part I: Experimental Characterization," IEEE Transactions on Components, Packaging, and Manufacturing Technology, 1(99), p. 1-11, 2017.
Alfa Aesar by Thermo Fisher Scientific, website: <https://www.alfa.com/en/catalog/040155/ >.
Alinger et al., "SOFC Development at GE Global Research, " 12th Annual SECA Workshop, Pittsburgh, PA (Jul. 26-28, 2011).
Behar, "Technology Roadmap Update for Generation IV Nuclear Energy Systems. In OECD Nuclear Energy Agency for the Generation IV International Forum," 2014; p vol. 17, No. 2018, pp. 19-52.
Bhatia et al., "Solar Thermal Aerogel Receiver (STAR)" MIT Case No. 184779, 2016.
Bierman et al., "Enhanced Photovoltaic Energy Conversion Using Thermally-Based Spectral Shaping," Nature Energy, 1(5), 2016.
Brosnan et al., "Comparison of the Properties of Tonpilz Transducers Fabricated with <001> Fiber-Textured Lead Magnesium Niobate-Lead Titanate Ceramic and Single Crystals," J. Acoust. Soc. of Am., 126 [5] 2257-2265 (2009).
Brosnan et al., "Microwave Sintering of Alumina at 2.45 GHz," J. Am. Ceram. Soc, 86 [8] 1307-1312 (2003).
Brosnan et al., "Templated Grain Growth of <001> Textured PMN-28PT using SrTiO3 Templates," J. Am. Ceram. Soc. 92 [S1] S133-139 (2009).
Brosnan et al., "Texture Measurements in <001> Fiber-Oriented PMN-PT," J. Am. Ceram. Soc., 89 [6] 1965-1971 (2006).
Brosnan, "SOFC Development at GE Global Research, "14th Annual SECA Workshop, Pittsburgh, PA (Jul. 24, 2013).
Caccia et al., "Ceramic-Metal Composites for Heat Exchangers in Concentrated Solar Power Plants," Nature 2018, 562 (7727), 406-409. https://doi.org/10.1038/s41586-018-0593-1.
Chen et al., "Air-Plasma Spraying Colloidal Solutions of Nanosized Powders," J. Mat. Sci., 39 4171-8 (2004).
Chen et al., "Degradation of Plasma-Sprayed Yttria-Stabilized Zirconia Coatings via Ingress of Vanadium Oxide," J. Eur. Ceram. Soc., 29 1647-1656 (2009).
Chen et al., "Investigation of Reactions Between Vanadium Oxide and Plasma-Sprayed Yttria-Stabilized Zirconia Coatings," J. Eur. Ceram. Soc., 29 1403-1411 (2009).
Chen et al., "Ultrahydrophobic and Ultralyophobic Surfaces—Some Comments and Some Examples," Langmuir 1999, 10, 3395-3399. (1317 cites, Googlescholar).
Cho et al., "Nanoengineered Materials for Liquid-vapour Phase-change Heat Transfer," Nature Reviews Materials, 2, p. 16092, 2016.
Chordia et al., "High Temperature Heat Exchanger Design and Fabrication for Systems with Large Pressure Differentials," Pittsburgh, PA, and Morgantown, WV (United States), 2017. https://doi.org/10.2172/1349235.

(56) References Cited

OTHER PUBLICATIONS

Chung et al., "Anisotropic Wetting on Tunable Micro-Wrinkled Surfaces," Soft Matter 2007, 3 (9), 1163-1169. (346 cites, Googlescholar).
Corman et al., in Compr. Compos. Mater. II, edited by C. Zweben (Oxford Academic Press, 2017), pp. 325-338.
Costakis et al., "Additive Manufacturing of Boron Carbide via Continuous Filament Direct Ink Writing of Aqueous Ceramic Suspensions," J. European Ceramic Society, 36 [14] 3249-3256 (2016).
Crumm et al., "Fabrication of Microconfigured Multicomponent Ceramics," J. Am. Ceram. Soc. 1998, 81 (4), 1053-1057. https://doi.org/10.1111/j.1151-2916.1998.tb02448.x.
David et al., "Weldability and Weld Performance of Candidate Nickel Base Superalloys for Advanced Ultrasupercritical Fossil Power Plants Part I," Fundamentals. Sci. Technol. Weld. Join. 2015, 20 (7), 532-552. https://doi.org/10.1179/1362171815Y.0000000035.
Diaz-Cano et al., "Stabilization of highly-loaded boron carbide aqueous suspensions," Ceramics International 2017, 43 (12), 8572-8578. DOI: 10.1016/j.ceramint.2017.03.111.
Dickinson et al., "Stress-Relaxation of Compression Loaded Plasma-Sprayed 7 wt.% Y2O3-ZrO2 Stand-Alone Coatings," J. Am. Ceram. Soc., 88 [8] 2202-2208 (2005).
Ellenberger, Piping and Pipeline Calculations Manual. Elsevier Inc., 2010.
Erk et al., "Grain-Boundary Grooving of Plasma-Sprayed Yttria-Stabilized Zirconia Thermal Barrier Coatings Using Stand Alone Coating Tests," J. Am. Ceram. Soc., 89 [5] 1673-8 (2006).
Exxentis Porous Aluminum Foam. http://porous-aluminum.com.
GE Aviation. The GE90 Engine. https://www.geaviation.com/commercial/engines/ge90-engine.
Hanks et al., "Nanoporous Membrane Device for Ultra High Heat Flux Thermal Management," Microsystems and Nanoengineering, 4(1), 2018.

Howarter et al., "Optimization of Silica Silanization by 3-Aminopropyltriethoxysilane," Langmuir 2006, 22, 11142-11147. (575 cites, Googlescholar).
Howarter et al., "Self-Cleaning and Anti-Fog Surfaces via Stimuli-Responsive Polymer Brushes," Advanced Materials 2007, 19, 3838-3843. (199 cites, Googlescholar).
Howarter et al., "Self-Cleaning and Next Generation Anti-Fog Surfaces and Coatings," Macromolecular Rapid. Communications 2008, 29, 455-466. (161 cites, Googlescholar).
Hoy et al., "Microfabrication of Ceramics by Co-Extrusion," J. Am. Ceram. Soc. 1998, 81 (1), 152-158. https://doi.org/10.1111/j.1151-2916.1998.tb02307.x.
Kim et al. "Water harvesting from air with metal-organic frameworks powered by natural sunlight" Science, 356(6336), p. 430-434, 2017.
Kim et al., "Adsorption-based atmospheric water harvesting device for arid climates," Nature Communications, 9, 2018.
Kim et al., "Grain Growth and Fracture Toughness of Fine-Grained Silicon Carbide Ceramics," J. Am. Ceram. Soc. 1995, 78 (11), 3145-3148. https://doi.org/10.1111/j.1151-2916.1995.tb09100.x.
Koh et al, Fabrication of macrochannelled-hydroxyapatite bioceramic by a coextrusion process. Journal of the American Ceramic Society, 85(10), 2578-2580 (2002).
Kovar et al., "Feature Article—Fibrous Monolithic Ceramics," J. Am. Ceram. Soc. 80(10), pp. 2471-2487, 1997.
Lenert et al., "A Nanophotonic Solar Thermophotovoltaic Device." Nature Nanotechnology, 9(2), p. 126-130, 2014.
Leroy et al., "Combined selective emitter and filter for high performance incandescent lighting," Applied Physics Letters, 111(9), p. 0941031- 0941035, 2017.
Levin et al., "In-situ Observation of Crack Behavior in Compressively Loaded Plasma-Sprayed 7 wt.% Yttria-Stabilized Zirconia," J. Am. Ceram. Soc., 87 [5] 960-2 (2004). (Note: This paper was highlighted in the MRS Bulletin, September, p. 609 (2004).

* cited by examiner

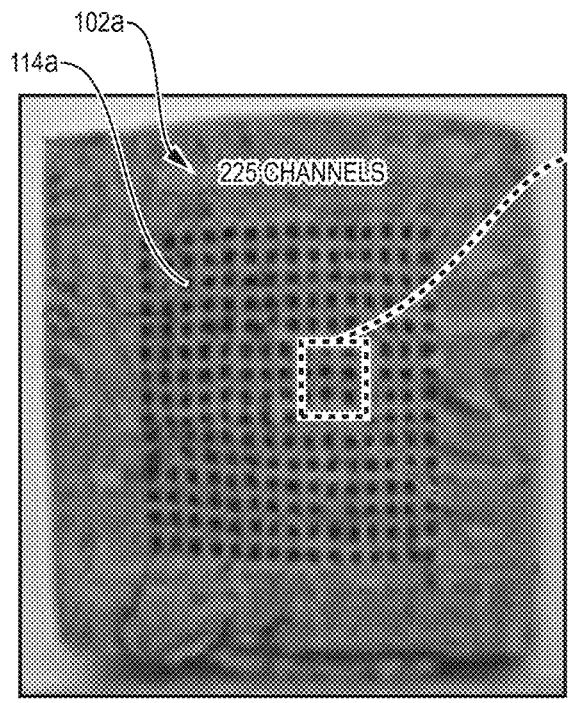 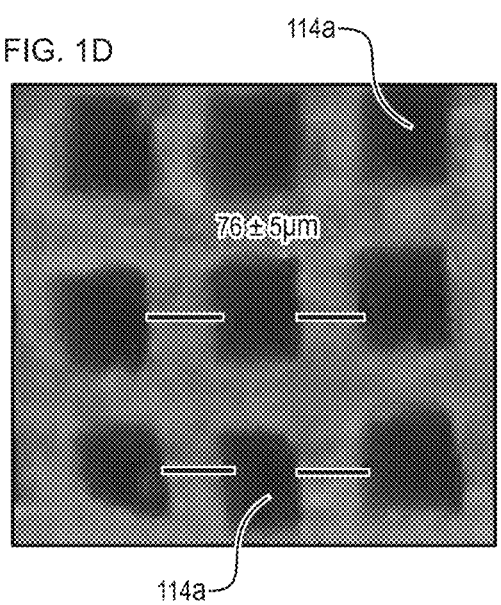
FIG. 1C  FIG. 1D
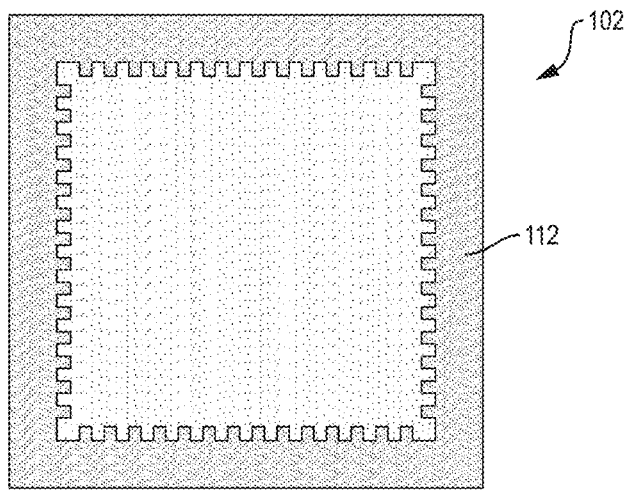
FIG. 1E

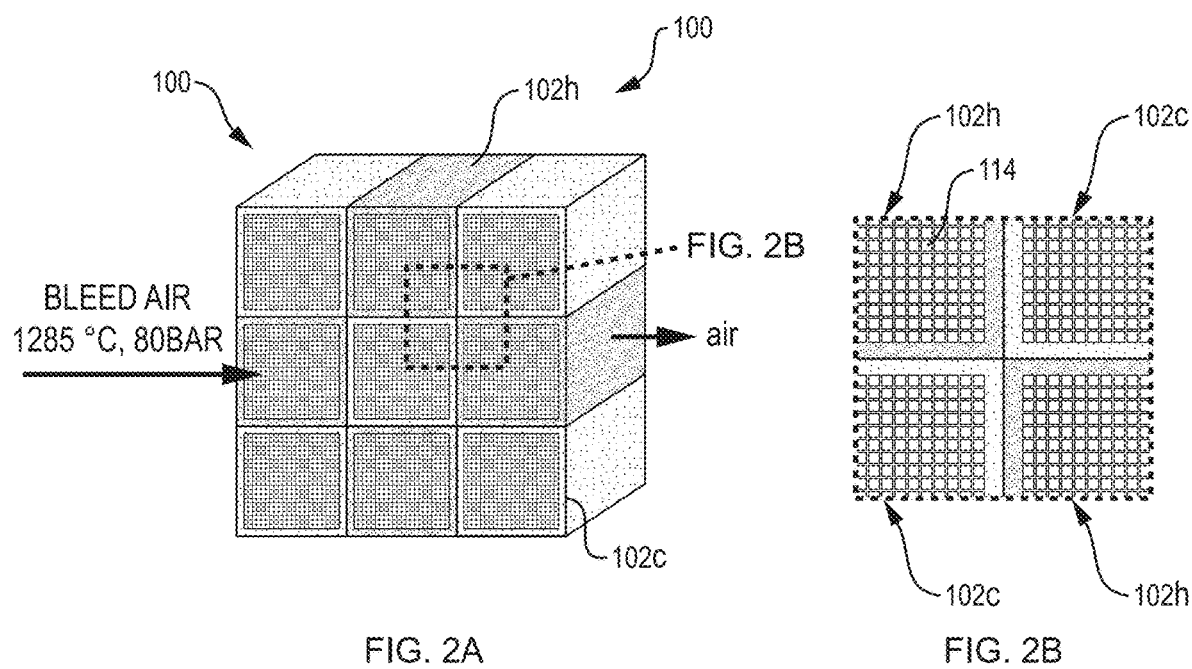
FIG. 2A
FIG. 2B
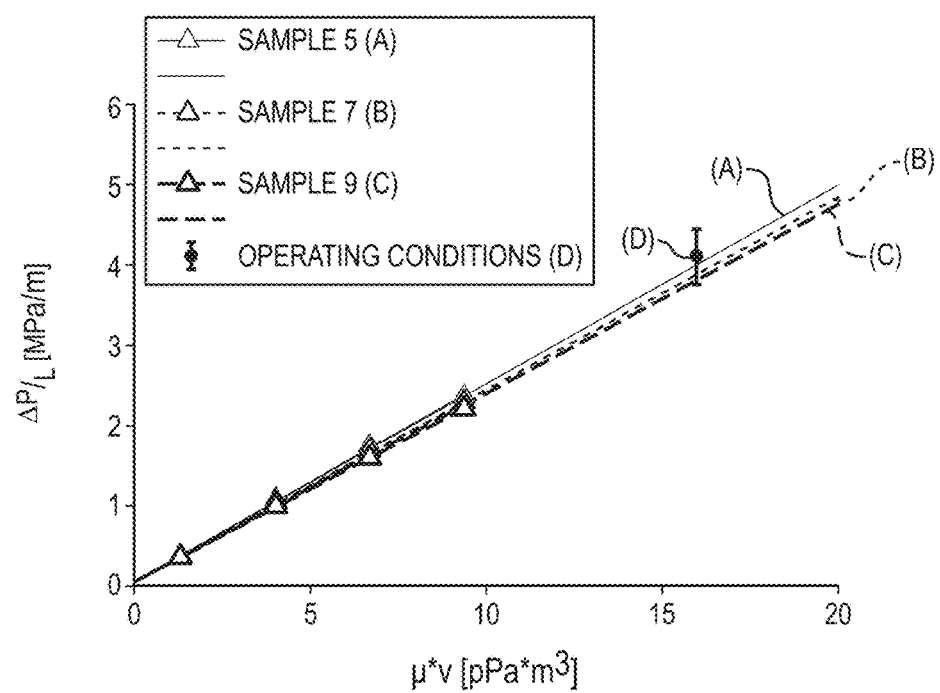
FIG. 2C

DEVICES AND METHODS FOR FABRICATION OF COMPONENTS OF A MULTISCALE POROUS HIGH-TEMPERATURE HEAT EXCHANGER

CROSS-REFERENCE TO RELATED APPLICATIONS

This application claims the benefit of U.S. Provisional Application No. 63/166,973, entitled "Devices and Methods for Fabrication of Components of a Multiscale Porous High-Temperature Heat Exchanger," filed on Mar. 27, 2021. The entire contents of this application are hereby incorporated by reference in their entirety.

GOVERNMENT RIGHTS

This invention was made with Government support under Grant No. DE-AR0001130 awarded by the Department of Energy. The Government has certain rights in the invention.

FIELD

The present disclosure relates to devices and methods for fabrication of components of a heat exchanger, and more particularly relates to use and fabrication of multiscale porous ceramic heat exchangers (MPHTs) that enable high heat transfer and have a low pressure drop penalty in high-temperature and high-pressure applications.

BACKGROUND

Heat engines or heat exchangers are systems that are used to transfer heat between two or more fluids that can be used in both cooling and heating processes. Efforts to enhance the heat engine efficiency are constantly evolving. Recent studies focus on increasing the operating temperatures and pressures of these heat engines because the high-temperature, high-pressure conditions can reduce the levelized cost of electricity in terrestrial power generation systems, as well as enhance electricity production efficiency in the field of aviation, among others. Although significant progress has been made on promising working fluids, including supercritical $CO_2$ and molten salts, the heat exchanger design still remains a limiting factor for the overall thermodynamic cycle.

The overall efficiency of aircrafts is directly related to the Brayton cycles that operate at high temperatures and pressures that are already well-optimized. Future efficiency improvements will operate at even higher temperatures and pressures, driving the need for novel heat transfer materials and configurations. These newer systems operating at high pressure ratios have pushed the compressors to outlet temperatures that are close to or even higher than the turbine exit temperatures. As a result, these high compressor and turbine outlet temperatures significantly reduce the effectiveness of the recuperator-type heat exchangers in the micro-gas turbines. These turbines typically constitute the auxiliary power unit (APU) of aircrafts and are needed to provide power when the engines are off on the ground or during emergencies.

The efficiency of a heat engine can be significantly improved by operating in a high-temperature and high-pressure environment. However, such extreme operating conditions pose a severe challenge to the heat exchanger design. Although recently developed super alloys and ceramics can survive high temperatures and high-pressure loads, where typical metals cannot survive in a solid state, using these materials in a traditional heat exchanger design results in a high cost and yields low power density. For example, the traditional shell-and-tube heat exchanger design remains undesirable for these high-temperature and high-pressure applications due to the large size of the system and the high cost associated with some of the advanced material.

Accordingly, to further improve the efficiency of the thermodynamic cycle, there is a need to develop a compact and high-performance heat exchanger to perform at high-temperature and high-pressure conditions.

SUMMARY

The present disclosure pertains to a multiscale porous heat exchanger design for high-temperature and high-pressure applications. More particularly, the heat exchanger leverages a scalable ceramic co-extrusion process to fabricate centimeter-scale channels that serve as channels for the flow of working fluids. Each macrochannel can include a two-dimensional microchannel array disposed therein to flow a working fluid therethrough. The macrochannels can be arranged in a checkerboard patterns to allow adjacent macrochannels to flow fluid in equal and/or opposite directions therethrough to enhance heat transfer and mechanical strength without significant pressure drop penalty. The heat exchanger can further include a header integrated therewith to distribute the working fluid flowing evenly therethrough. The headers of the present disclosure can be used in conjunction with multiscale porous heat exchangers provided for herein, and can also be used and otherwise adapted for other heat exchanger designs and configurations.

One exemplary embodiment of a heat exchanger includes a plurality of macrochannels and a two-dimensional microchannel array disposed within each macrochannel of the plurality of macrochannels. The two-dimensional microchannel array is configured to allow a first working fluid to flow through it and through the respective macrochannel. Each macrochannel of the plurality of macrochannels has one or more adjacent macrochannels of the plurality of macrochannels, each of which has the respective two-dimensional microchannel channel array disposed in it. The respective two-dimensional array is configured to allow a second working fluid to flow through it in an equal and opposite direction to the first working fluid. Still further, the heat exchanger is configured such that a temperature of the first working fluid is higher than a temperature of the second working fluid.

The plurality of macrochannels can be arranged in a checkerboard pattern. Each microchannel in the two-dimensional microchannel array can be disposed in a substantially straight line through each respective macrochannel of the plurality of macrochannels. In some embodiments, the two-dimensional microchannel array through which the second working fluid flows can be configured to have a lower temperature at a center of the array than at an outer portion of the array as the second working fluid flows through the array. In some embodiments, the two-dimensional microchannel array through which the second working fluid flows can be configured to have a decreasing temperature gradient from an outer surface to a center thereof as the second working fluid flows therethrough. Alternatively, or additionally, the two-dimensional microchannel array through which the first working fluid flows can be configured to have an increasing temperature gradient from an outer surface to a center thereof as the first working fluid flows therethrough.

In some embodiments, the working fluid flowing through the macrochannels is in a gaseous form. The first working fluid can differ in composition from the second working fluid.

The heat exchanger can be manufactured by co-extrusion. In some embodiments, the heat exchanger can include a high-thermal conductivity ceramic. The high-thermal conductivity ceramic can include silicon carbide.

One exemplary embodiment of a header to be used with a heat exchanger includes a first header component, a second header component, a flow distribution component, a blocker plate, a plurality of connectors, and at least one cycle adaptor. The first header component has at least a first inlet and a first outlet, and similarly, the second header component has at least a second inlet and a second outlet. The flow distribution component is configured to mount to a heat exchanger. The flow distribution component includes a plurality of openings that are configured to receive a working fluid through them. The blocker plate configured to selectively block a first portion of the plurality of openings of the flow distribution component while selectively allowing fluid to flow through a second portion of the plurality of openings of the flow distribution component. The plurality of connectors are coupled to the blocker plate, with the blocker plate being disposed between the plurality of connectors. The at least one cycle adaptor is coupled to a connector of the plurality of connectors and is in fluid communication with the flow distribution component via the blocker plate and the connector of the plurality of connectors. The first inlet is configured to receive a first working fluid and pass the first working fluid through the at least one cycle adaptor to the first portion of the plurality of openings and the first outlet. Further, the second inlet is configured to receive a second working fluid and pass the second working fluid through the at least one cycle adaptor to the second portion of the plurality of openings and the second outlet. Each of the flow distribution component, the blocker plate, the plurality of connectors, and the at least one cycle adaptor includes a high-thermal conductivity ceramic.

At least one opening of the plurality of openings can include a tapered surface that extends from a surface of the flow distribution component such that one of the first working fluid and the second working fluid flowing through the opening(s) contacts the surface across a larger area than another outlet of the respective plurality of first and second outlets. In some embodiments, each of the plurality of openings can be disposed over a macrochannel in the heat exchanger.

In some embodiments, one or more channels can be disposed between the first portion of openings. The one or more channels can be disposed at a substantially perpendicular angle with respect to the first portion of openings. The first working fluid can be configured to pass through the one or more channels to distribute the working fluid throughout the first portion of openings prior to passing through the first portion of openings.

The header can be configured such that the first working fluid flowing through the first inlet flows at approximately a 90-degree out of plane angle with respect to the first portion of openings. Moreover, the header can be configured such that the second working fluid flowing through the second inlet flows substantially parallel to the heat exchanger. In some embodiments, the header can be symmetric about opposite sides of the heat exchanger. The header can be manufactured by at least one of injection molding or machining. The second header component can include an air header component disposed over at least a portion of the blocker plate and coupled to at least one of blocker plate and the plurality of connectors. In some embodiments, the at least one cycle adaptor can further include two cycle adaptors.

BRIEF DESCRIPTION OF DRAWINGS

This disclosure will be more fully understood from the following detailed description, taken in conjunction with the accompanying drawings, in which:

FIG. 1C is a perspective front view of one embodiment of a unit cell sample macrochannel having two hundred twenty-five microchannels formed therein;

FIG. 1D is a magnified perspective front view of a junction of nine microchannels of the unit cell sample macrochannel of FIG. 1C;

FIG. 1E is a magnified schematic illustration of a macrochannel of the heat exchanger of FIG. 1A having no microchannels formed therein, showing that there is a limited area for convection heat transfer to the working fluid, leading to low thermal performance;

FIG. 2A is a schematic front view of the heat exchanger of FIG. 1A with multiscale porosity showing air bleed flowing into the heat exchanger and air flowing out of the heat exchanger;

FIG. 2B is a magnified schematic front view of a junction of four macrochannels of the heat exchanger of FIG. 2A showing the respective microchannels formed therein;

FIG. 2C is a graph illustrating a relationship between pressure drop per unit length and flows velocity×viscosity used to extrapolate operating conditions for an air working fluid for three samples;

DETAILED DESCRIPTION

Figure 1A:
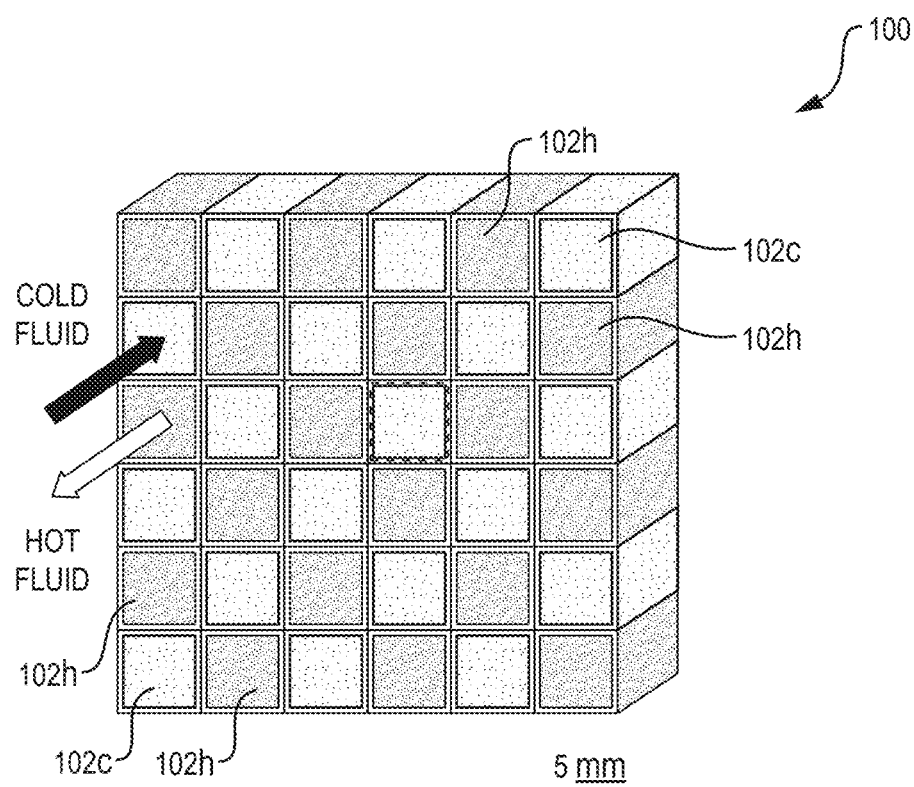
FIG. 1A is a schematic illustration of an exemplary embodiment of a counterflow heat exchanger that includes macrochannels in a checkerboard pattern with each macrochannel having a working fluid of alternating hot and cold temperature flowing therethrough.

Certain exemplary embodiments will now be described to provide an overall understanding of the principles of the techniques, structure, function, manufacture, and use of the methods and resulting devices and systems disclosed herein. One or more examples of these embodiments are illustrated in the accompanying drawings. Those skilled in the art will understand that the methods, and resulting devices and systems, specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, to the extent features, sides, objects, steps, or the like are described as being "first," "second," "third," etc., such numerical ordering is generally arbitrary, and thus such numbering can be interchangeable.

To the extent that a term like "porous" or "microporous" is used to describe the channels of the present of embodiments, e.g., the microchannels, it will be recognized that this is due to the size of various channels of the heat exchanger being small enough to resemble a porous structure rather than the channels having pores therein, as channels with pores may be undesirable due to heat loss experienced by a core of the heat exchanger. Further, a person skilled in the art will recognize various terms that are used herein interchangeably, such as the terms "core" and "heat exchanger" to refer to the part of the heat exchanger having channels formed therein through which a working fluid flows, and the terms "header" and "manifold" to refer to additional component(s) that interact with the heat exchanger to facilitate flow therethrough. Additionally, like-numbered components across embodiments generally have similar features unless otherwise stated or a person skilled in the art would appreciate differences based on the present disclosure and his/her knowledge.

The present disclosure generally relates to an ultrahigh power density ceramic heat exchanger for high-temperature applications enabled by a multiscale design having a series of channels formed therein. More particularly, the present disclosure relates to: (1) a multiscale porous ceramic counterflow heat exchanger design, (2) a scalable co-extrusion fabrication process to fabricate ceramic microstructures similar to those required for the proposed heat exchanger, and (3) a compact manifold or header design that integrates seamlessly with the heat exchanger channels. The presently disclosed heat exchanger can thermally connect an open loop circuit and a closed loop sCO$_2$ circuit that are part of a Brayton cycle that is part of an auxiliary power unit (APU) application to improve energy efficiency and reduce emissions as compared to the existing methods, e.g., micro-gas turbines currently used in aircrafts. The heat exchanger can include counterflow square macrochannels which are on the scale of centimeters, where cold and hot working fluids are flowing in a checkerboard pattern. A scaffold structure is constructed inside each macrochannel to form a network of microchannels, which can be fabricated by co-extrusion processes. This multiscale configuration enables high heat transfer and a low pressure drop penalty. These structures can be fabricated using a single-step ceramic co-extrusion process capable of creating features tens of microns in size using different material combinations. The multiscale porous heat exchanger configuration, along with the scalable manufacturing process, can enable high-temperature, high-pressure heat exchangers that are low-cost (<$2,000° C./kW), compact (volume-based power density >100 MW/m$^3$ or >700 MW/m$^3$), and lightweight (mass-based power density >100 kW/kg or >250 kW/kg), which improves the performance of aircraft power cycles and other ground-based power generation systems. By optimizing the design of centimeter-scale macrochannels and micrometer-scale microchannels as provided for herein, the result can be a significant improvement to both the heat transfer and structural strength of the heat exchanger with a negligible pressure drop penalty. The results are much improved as compared to current state-of-the-art solutions.

Heat Exchanger

FIG. 1A illustrates an exemplary embodiment of a multiscale porous high-temperature (MPHT) ceramic heat exchanger (HX) or core 100. As shown, the heat exchanger 100 can include one or more macrochannels 102 formed therein for flowing a working fluid therethrough. The macrochannels 102 can be arranged in a checkerboard pattern such that adjacent macrochannels are nestled along-side one another with substantially no gaps between adjacent macrochannels. While substantially square macrochannels 102 are shown, it will be appreciated that, in some embodiments, the macrochannels 102 can be in the shape of another quadrilateral (e.g., rectangle, rhombus, or parallelogram), or can be triangular, hexagonal, and so forth. A size of the macrochannels can be on the scale of centimeters, though, in some embodiments, millimeter macrochannels are possible.

While each macrochannel 102 is shown as having the same size, which can enable symmetrical manufacture of the core and therefore absence of gaps between macrochannels that can negatively affect efficiency of the core, a person skilled in the art will recognize that in some embodiments, the macrochannels 102 can have varying shapes and/or sizes to assemble the core.

Each macrochannel can have a working fluid flowing therethrough. The present core 100 can include different fluids flowing in adjacent channels, thereby creating a counterflow pattern. For example, where a first macrochannel includes a cold fluid flowing therethrough, or cold macrochannels 102c, adjacent macrochannels can have a hot fluid flowing therethrough, or hot macrochannels 102h. A non-limiting example of a temperature range of the cold fluid can include approximately in the range of about 250° C. to about 900° C. and a non-limiting example of a temperature range of the hot fluid can include approximately in the range of about 500° C. to about 1500° C. In at least some embodiments, the heat exchanger of the present disclosure can operate at temperatures above 1200° C. and in a variety of environments, including aerospace and terrestrial applications such as nuclear power plants and concentrated solar power systems, which is not typical of heat exchangers that existed prior to the present disclosures.

The working fluid flowing through the macrochannels 102 can be in a gas or liquid form. For example, in some embodiments, critical carbon dioxide can run through the macrochannels, the critical carbon dioxide being more like a liquid but runs like a gas.

The instant configuration differs from previous configurations of a heat exchanger, which typically include macrochannels having the same fluid at each level. As shown, the presently disclosed core 100 includes different fluids flowing in adjacent channels, creating the counterflow pattern shown in FIG. 1A. For example, cold fluid can travel into the cold macrochannel 102c, while hot fluid travels out of the hot macrochannel 102h, or vice versa.

The heat exchanger 100 can be made from a high-thermal conductivity ceramic such as silicon carbide (SiC) due to its low cost, high thermal conductivity, high melting point, and stable mechanical strength at high temperatures, though, some additional non-limiting examples of the material can include silica such as fused silica, metal alloys, higher-strength $Si_3N_4$, lower density $B_4C$, carbon nanocomposites, other ceramic materials, and so forth.

Figure 1B:
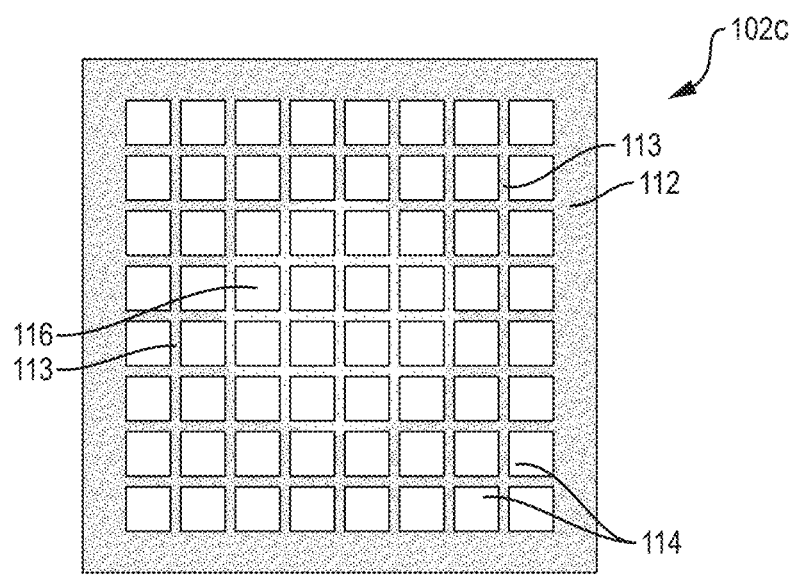
FIG. 1B is a magnified schematic illustration of one macrochannel of the heat exchanger of FIG. 1A with the microchannel walls within the macrochannel enhancing the heat transfer therein to provide high thermal performance.

FIG. 1B illustrates a magnified view of the cold macrochannel 102c of the heat exchanger. As shown, each macrochannel 102 can include a scaffold structure therein to form a network or array of microchannels 114, which can be fabricated by the established co-extrusion process. As shown, the microchannels 114 can be disposed in the form of a two-dimensional array within the body of the macrochannel 102. The macrochannel 102 can include a thick outer wall 112 surrounding a series of walls 113 forming microchannels 114 in a grid-like pattern therebetween. While an 8-by-8 microchannel pattern is shown, a plethora of other configurations are possible in view of the present disclosures. By way of non-limiting example, as shown in FIG. 1C, a unit cell sample macrochannel 102a can include a larger array of microchannels 114a therein. For example, in some embodiments the unit cell sample macrochannel 102a can include approximately 225 microchannels 114a, for instance arranged in a 15-by-15 pattern. In the illustrated embodiment of FIGS. 1C and 1D, the microchannels 114a are arranged in a 3 millimeter by 3 millimeter array. Turning back to FIG. 1B, the outer wall 112 of the cold macrochannel 102c can be at an elevated temperature, e.g., hot, as the adjacent macrochannels are hot macrochannels 102h, thereby transferring heat into the cold macrochannel 102h. Moreover, the temperature can decrease when moving towards a center 116 of the cold macrochannel 102c. It will be appreciated that in the hot macrochannel 102h, the outer wall 112 can be at a reduced temperature, as heat is escaping towards the adjacent cold macrochannels 102c, thereby forming a gradient from the center 116 to the outer wall 112. Similarly, the center of the hot macrochannel 102 can be its hottest point, as this location can dissipate the least heat towards the adjacent macrochannels. The alternating square channels can maximize heat transfer through the core, and due to the higher thermal conductivity of the microchannel walls, heat can transfer more efficiently between the working fluids, leading to more efficient thermal performance.

A size or length of the microchannels 114 can vary. For example, 200 μm individual microchannels can be used to allow the working fluid to flow therethrough, though an approximate range of sizes of the microchannels can be from about 10 μm to about 2 mm are possible. In other embodiments, such as the unit cell sample macrochannel 102 shown in FIG. 1D, adjacent microchannels 114 can be approximately ~76 μm±5 μm. In some embodiments, microchannels can be approximately ~120 μm and/or ~140 μm, and due to their small scale compared to a channel length of the microchannel (~4 cm), the internal flow can be assumed to be fully developed, leading to an average Nusselt number of about 3.61 for square ducts. Moreover, a person skilled in the art will recognize that microchannel sizes can be reduced to approximately ~105 μm after sintering or other similar processes known to those skilled in the art. In light of the above, as the size of the microchannels 114 decreases, the heat transfer performance improves while the pressure drop increases. However, a person skilled in the art will recognize that a pressure drop of even below about 1% can be met for a wide range of channel sizes, while having high thermal resistance values.

The high surface area and thermal conductivity of the core can increase the heat transfer coefficient. Additionally, these microporous features can be engineered to be highly anisotropic—long microscale channels in the flow direction—which can significantly decrease the pressure loss along the heat exchanger. Further, the core can provide additional structural rigidity to the macrochannels, thereby allowing operation at high fluid pressures. Moreover, due to the higher thermal conductivity of the microchannel walls 113, heat can transfer more efficiently between the working fluids as compared to macrochannels that lack microchannels. Efficient heat transfer can lead to more efficient thermal performance, while the straight microchannels 114 can achieve high permeability and avoid a significant pressure drop.

FIG. 1E illustrates one such embodiment of a macrochannel 102 that has a single-scale of porosity, or is devoid of microchannels. Without a microchannel, the macrochannel 102 in FIG. 1E has a limited area for convection heat transfer to the working fluid, leading to low thermal performance. In such embodiments, improvement in power density can be achieved with smaller characteristic lengths, but at the expense of increased complexity and cost. In comparison, with cores having two levels of porosity, such that the macrochannels 102 having one or more microchannels 114 therein, as shown in FIG. 1B, a significant enhancement in power density can be achieved at a lower fabrication cost using a scalable co-extrusion fabrication process described below.

In some embodiments, the microchannel size and length can affect the effectiveness and volumetric power density of the total heat exchanger. As channels are built longer, effectiveness can increase but volume power density can drop. Smaller macrochannels 102 can enhance both the effectiveness and the volume power density of the resulting heat exchanger, but they can pose more challenges in the fabrication process. Lower porosity in the macrochannel can lead to better heat transfer across the microchannel network but can increase the overall heat exchanger weight. Although the macrochannel wall 112 thickness may have a negligible effect on the overall heat transfer between fluids, thicker walls can reduce the cross-section area for the flows, can demand a higher flow velocity, and/or can decrease the overall thermal performance, while each of effectiveness, weight, and volume power density can increase with a thinner wall thickness.

Figure 1F:
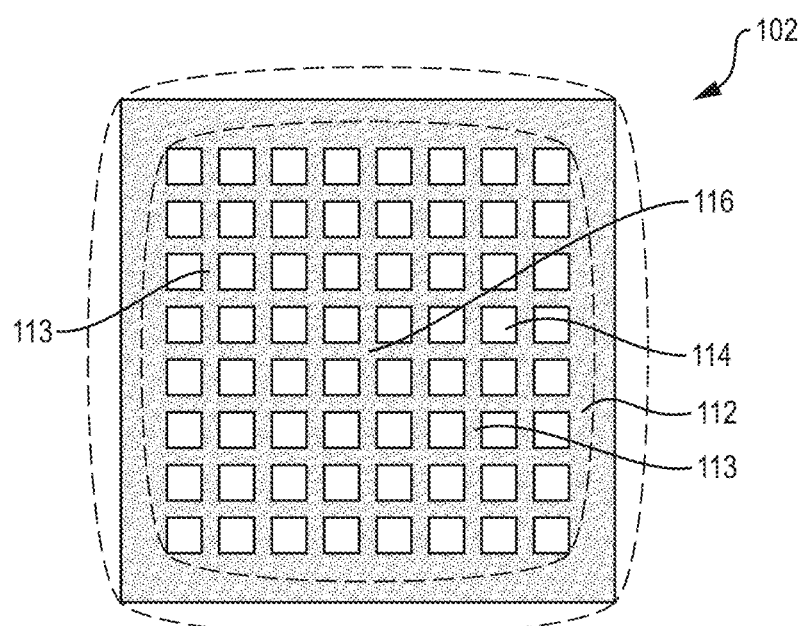
FIG. 1F is a magnified schematic view of the macrochannel of FIG. 1B showing the microchannel walls that also reinforce the mechanical strength as they help support the pressure difference between working fluids.
Figure 1G:
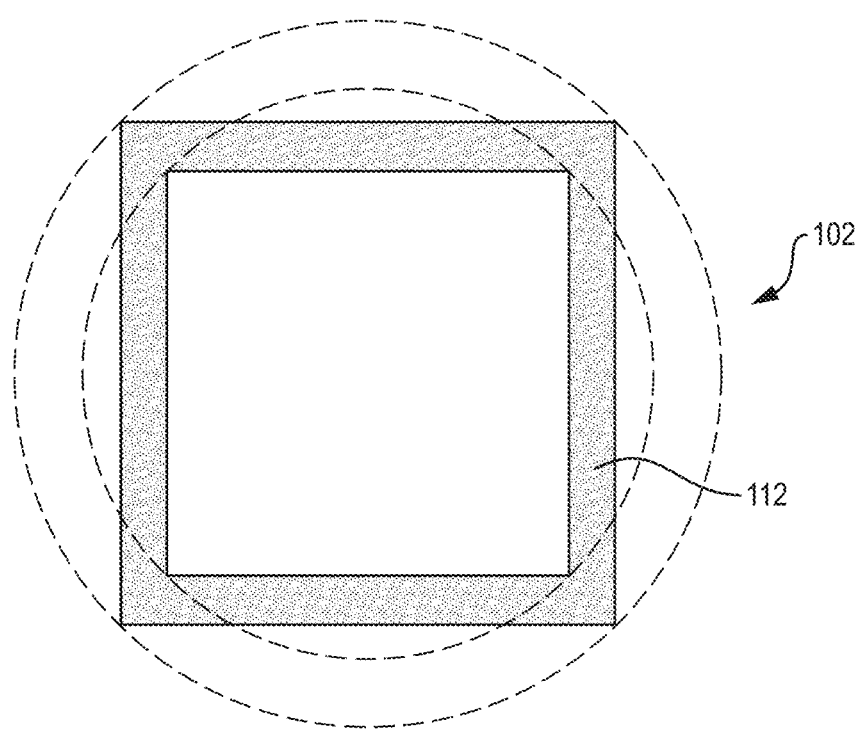
FIG. 1G is a magnified schematic view of the macrochannel of FIG. 1E showing that the macrochannel walls experience significantly higher stress and deformation, leading to less robust mechanical reliability.

By way of further example, as shown in FIG. 1F, the scaffold structure formed by the microchannel walls can also enhance the mechanical strength, which can be demanded by the high-pressure working fluids. Modeling of the mechanical strength shows that the microchannels 114 can effectively dissipate the high-pressure difference between working fluids, reducing a wall thickness of the macrochannel and reducing the overall volume of the heat exchanger, as compared to macrochannels that lack microchannels. FIG. 1G illustrates one such embodiment of a macrochannel that is devoid of microchannels, which shows that the macrochannel walls can experience significantly higher stress and deformation, which can lead to less robust mechanical reliability. The dashed lines in FIG. 1G represent the magnified deformation of the macrochannel walls 112 under a pressure difference between working fluids. A person skilled in the art will recognize that the illustrations of FIGS. 1B and 1E-1G serve as schematic representations of the design benefits of the heat exchangers of the present disclosure and are not to scale with respect to the quantitative results that are pictured therein.

The checkerboard pattern of the heat exchanger 100 has several advantages over the conventional shell-and-tube heat exchanger. Shell-and-tube heat exchangers are made up of a plurality of cylindrical components that are disposed over and/or next to one another, which, despite efforts to increase their compactness, can naturally leave gaps between adjacent tubes. As a result, shell-and-tube heat exchangers have to withstand a big pressure drop across a small surface area, which negatively impacts efficiency. Moreover, these heat exchangers have a small surface area over which to withstand said pressure given the gaps formed between individual cylindrical tubes, which minimizes the surface area for heat transfer.

For example, the shape of the macrochannels 102 of the heat exchanger 100 being manufactured in a square pattern increases the surface area of the heat exchanger and the overall flow exposure of hot fluids to cold fluids, and vice versa. Moreover, each macrochannel having a substantially square shape enables macrochannels to be more compact with respect to adjacent macrochannels, minimizing the existence of gaps, which results in biometric energy densities that are magnitudes better than conventional heat exchangers. The checkerboard pattern of the instantly disclosed heat exchanger allows for macrochannels of alternating fluid temperature to flow adjacent to one another in an alternating pattern. That is, each macrochannel is surrounded on all four sides by macrochannels having a fluid flow in an equal and opposite direction, with one fluid having a hot temperature while the other has a cold temperature, creating an optimal opportunity for heat exchange to occur.

An additional benefit of the present heat exchanger 100 over the shell-and-tube heat exchanger is the size of the channels through which the working fluid flows. Shell-and-tube heat exchanger can include tubes having diameters typically that are on the scale of centimeters or, at best, millimeters. These diameters differ from the microchannels 114 of the presently disclosed heat exchanger 100, which are sized in micrometers or even nanometers. Microchannels having smaller diameters readily allow conduction of heat therethrough, as heat can dissipate through the microchannels 114 to the center 116 more readily than if larger volumes of fluid flowed therethrough.

FIGS. 2A and 2B illustrate the heat exchanger 100 having macrochannels 102 with working fluids set as air at 1285° C. and 80 bar and supercritical $CO_2$ at 300° C. and 250 bar flowing therethrough, which are subject to change based on potential applications, e.g., aviation. Both flows can maintain a mass flow rate of about 0.0046 kg/s per macrochannel to maintain laminar flows for low pressure drops. FIG. 2B shows a magnified view of a quadrant at the intersection of four macrochannels 102. As shown, outer walls 112 of each of the macrochannels 102 have a temperature that is either higher to that of each adjacent channel or lower than that of each adjacent channel.

In some embodiments, pressure drop data can be collected with pressure transducers. For example, volumetric flow rate can be varied from approximately between about 1 square liter per minute to about 7 square liters per minute (SLPM), with a working fluid of air at about 25° C. and an outlet condition of about 1 bar (atmospheric pressure) for the system. Pressure drop and flow rate data can be converted to microchannel volumetric flow rate Q using Equation (1), reproduced below, and then used to calculate the average hydraulic diameter $D_h$ of a microchannel using Equation (2), reproduced below. Equation (2) is the Darcy-Weisbach equation, an empirical formula for relating the pressure loss due to friction along a length of pipe to the average velocity and cross-sectional area in the case of an incompressible fluid.

$$Q = \text{total flow rate} \times \frac{T_g}{298.15[K]} \times \frac{1.01325 \ [\text{bar}]}{P_g} \times \frac{1}{\text{\# of channels}} \quad (1)$$

$$\frac{\Delta P}{L} = \frac{32 \mu Q}{D_h^4} \quad (2)$$

It will be appreciated that for calculations viscosity $\mu$ of the working fluid was taken from literature for air at room temperature as $$\mu = 1.81 \times 10^{-5} \frac{kg/m}{s},$$

and lengths L of samples were measured for use in the equations. Propagation of error using Equation (3) can be used to determine the precision of hydraulic diameter estimations given uncertainties in experimental processes. One skilled in the art will recognize that these experimental uncertainties are due, at least in part, to measurement equipment limitations, and can be as follows: flow rate v±0.01 SLPM, length L±0.1 mm, pressure drop ΔP±200 Pa.

$$\frac{\sigma D_h}{D_h} = \frac{1}{4}\sqrt{\left(\frac{\sigma_v}{v}\right)^2 + \left(\frac{32 \times \sigma_\mu}{32 \times \mu}\right)^2 + \left(\frac{\sigma_L}{L}\right)^2 + \left(\frac{\sigma_{\Delta P}}{\Delta P}\right)^2} \quad (3)$$

Pressure drop across a sample as a function of mass flow rate can be recorded and an average microchannel hydraulic diameters $D_h$ can be calculated using the Darcy-Weisbach Relation $$\frac{\Delta p}{L} = \frac{32 \mu v}{D_h^4}$$

with flow velocity v, sample length L, and dynamic viscosity $\mu$ of air at room temperature and atmospheric pressure. One skilled in the art will recognize that material properties can be taken at an average temperature along the core of about 1267 K and 625 microchannels can be assumed per macrochannel.

FIG. 2C illustrates experimental measurement for pressure drop recorded following testing of three unit cell samples, such as those shown in FIGS. 1C-1D, with hydraulic diameter values shown in Table 1, reproduced below:

TABLE 1

Average hydraulic diameter of the microchannels internal to each sample

| Sample # | Hydraulic Diameter $D_h$ [µm] |
|---|---|
| 5 (A) | 104.4 ± 0.5 |
| 7 (B) | 105.7 ± 0.3 |
| 9 (C) | 106.4 ± 0.3 |

As shown in FIG. 2C, the three samples (A), (B), and (C) and operating conditions (D) can be compared for their values of pressure drop per unit length and flows velocity× viscosity and extrapolated out to operating conditions for the air working fluid using the Darcy-Weisbach relation. The pressure drop for the three samples (A), (B), and (C) can be substantially equal at low values of velocity×viscosity, and can begin to deviate at values of approximately 10 or higher, with (A) having a larger pressure drop than B, which is larger than C. The above-described extrapolation predicts a pressure loss in the air core of approximately 2%, which is below the target 4% pressure drop for the air working fluid. In view of the above, a microchannel size of approximately 105 µm, as discussed above, can be supported by image analysis of the samples graphed in (A), (B), and (C) of FIG. 2C ($D_h$=99±10 µm), and can be used to quantitatively demonstrate the successful fabrication of open, straight microchannel arrays.

Figure 3:
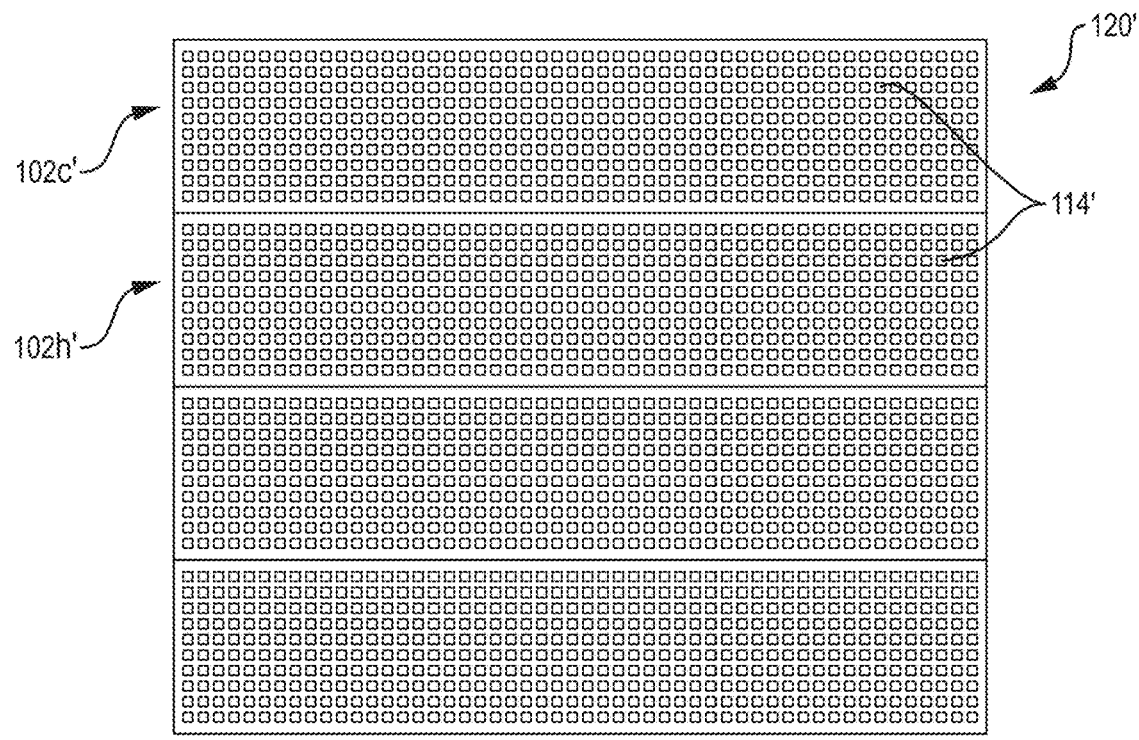
FIG. 3 is a schematic front view of an alternative embodiment of a simplified heat exchanger with plate-type channels.

FIG. 3 illustrates an alternative embodiment of a heat exchanger 100', which represents a simplified version of the heat exchanger of FIG. 1 having plate-type channels. As shown, the macrochannel plates 102' of the simplified heat exchanger 100' can include alternating plates of hot macrochannel plates 102h' and cold macrochannel plates 102c'. Each macrochannel plate can further include microchannels 114', with the working fluid flowing therethrough. For example, hot macrochannel plates 102h' and cold macrochannel plates 102c' can carry "hot" air and "cold" sCO$_2$, respectively.

In the simplified heat exchanger 100', internal macrochannel plates 102' can be surrounded on opposite ends by macrochannel plates of opposite temperature, while top and bottom macrochannel plates 102' may only have a single adjacent macrochannel plate 102'. The reduction in interfacial area between the hot and cold fluid in the plate configuration, in comparison to the substantially square configuration, can result in an approximately 2× reduction in the thermal resistance value of the heat exchanger 100' for nominal micro-porosities (~50%).

While this heat exchanger configuration can significantly affect heat transfer performance, the presence of microchannels in each macrochannel plate 102' structure can ensure that it still achieves high thermal performance with structural robustness. For example, the heat transfer performance can degrade significantly as the microscale porosity approaches one (1), representing "macro-porous" open channels. On the other hand, while the heat transfer is maximum for microscale porosity approaching zero (0), the significant penalty associated with significant pressure drop (and cost and complexity) can make it impractical. Thus, a size of the macrochannels and/or microchannels can be tuned in view of the present disclosures until an optimal configuration is found. The disclosures provided for herein provide sufficient teachings to enable a person skilled in the art to arrive at an optimal configuration when considering the various factors that can impact the final macrochannel(s) and/or microchannel(s) designs, and such optimization would not be considered routine experimentation. The determination of an optimal configuration for a particular scenario is made possible by the teachings of the present disclosure. For example, in some embodiments, lower porosity in the macrochannel can lead to better heat transfer across the microchannel network but can increase the overall weight of the heat exchanger. Further, the plate-type design can reduce the complexity associated with fabrication and interfacing of channels and manifolds, which may be desirable as it can reduce weight and/or cost. In another alternative embodiment, the heat exchanger can be packed with a copper medium in lieu of the two-dimensional array of microchannels.

The counterflow heat exchanger of the present embodiments can include one or more extruded and/or sintered composite ceramic structures with two-levels of porosity to enable operation at extreme conditions, along with maximization of heat transfer, and minimization of pressure drop. A person skilled in the art will recognize that the flow is isolated in each individual microchannel, so the pressure drop for one microchannel can represent the overall pressure drop of the heat exchanger. While co-extrusion is mentioned here to provide a scalable fabrication method as an example, some non-limiting examples of fabrication methods for the heat exchanger can include 3D printing, ceramic extrusion, and so forth. In some embodiments, the multiscale configuration can be fabricated using a single-step ceramic co-extrusion process capable of creating features tens of microns in size using different material combinations. Table 1 summarizes the designs for two non-limiting, different high-temperature high-pressure applications, one for aviation and one for concentrated solar power, demonstrating the versatility of multiscale porous heat exchangers as provided for herein.

TABLE 2

Design and Performance of Optimized Heat Exchangers

| Parameter | Aviation | Concentrated Solar Power |
|---|---|---|
| Microchannel size | 140 µm (air, sCO$_2$) | 140 µm (sCO$_2$); 0.7 mm (molten salt) |
| Microchannel wall | 60 µm (air, sCO$_2$) | 60 µm (sCO$_2$); 0.3 mm (molten salt) |
| Macrochannel core | 5 mm | 5 mm |
| Macrochannel wall | 1 mm | 1 mm |
| Channel length | 4 cm | 25 cm |
| Effectiveness | 50% | 95% |
| Volume power density | 717 MW/m$^3$ | 9.71 MW/m$^3$ |
| Mass power density | 300 kW/kg | 4.05 kW/kg |

A person skilled in the art will appreciate that the exemplary designs provided for specific applications provided for in Table 1 may be useful in other applications, and likewise, other designs are possible for those two identified applications.

In some embodiments, individual macrochannels can be extruded and laminated together in a 3×3 grid, which can then be laminated together in a 2×2 arrangement with extra cladding (walls). Such extrusion and lamination can ensure good adhesion. Alternatively, in some embodiments, the heat exchanger can be extruded such that the entire exchanger is extruded in a single operation. This extrusion can enable extrusion of shapes varying in complexity and/or material complexity. Material used in the extrusion can be formed, for example, by combining different polymer and/or ceramic blends, controlling their quantity and other materials (e.g., density, thickness, etc.) as desired.

In some embodiments, the heat exchanger can thermally connect an open loop air circuit and closed loop $sCO_2$ cycle of a proposed auxiliary power unit. Some non-limiting examples of applications in which the heat exchanges of the present disclosure can be used include aviation, such as being used as an auxiliary power unit, and terrestrial power generation, such as providing nuclear power and/or concentrated solar power (CSP), among others.

Header

In at least some embodiments, the heat exchanger 100 can be integrated with a header. The header can have several configurations but ideal headers should minimize or eliminate each of degradation of heat transfer, increases in pressure loss, and/or causation of stress concentration, while avoiding making the heat exchanger bulky as compared to existing heat exchangers. A person skilled in the art will recognize that headers that can come as close as possible to the ideal, e.g., headers having the smallest pressure drops and the smallest volumes, provide better results than their larger counterparts.

Figure 4:
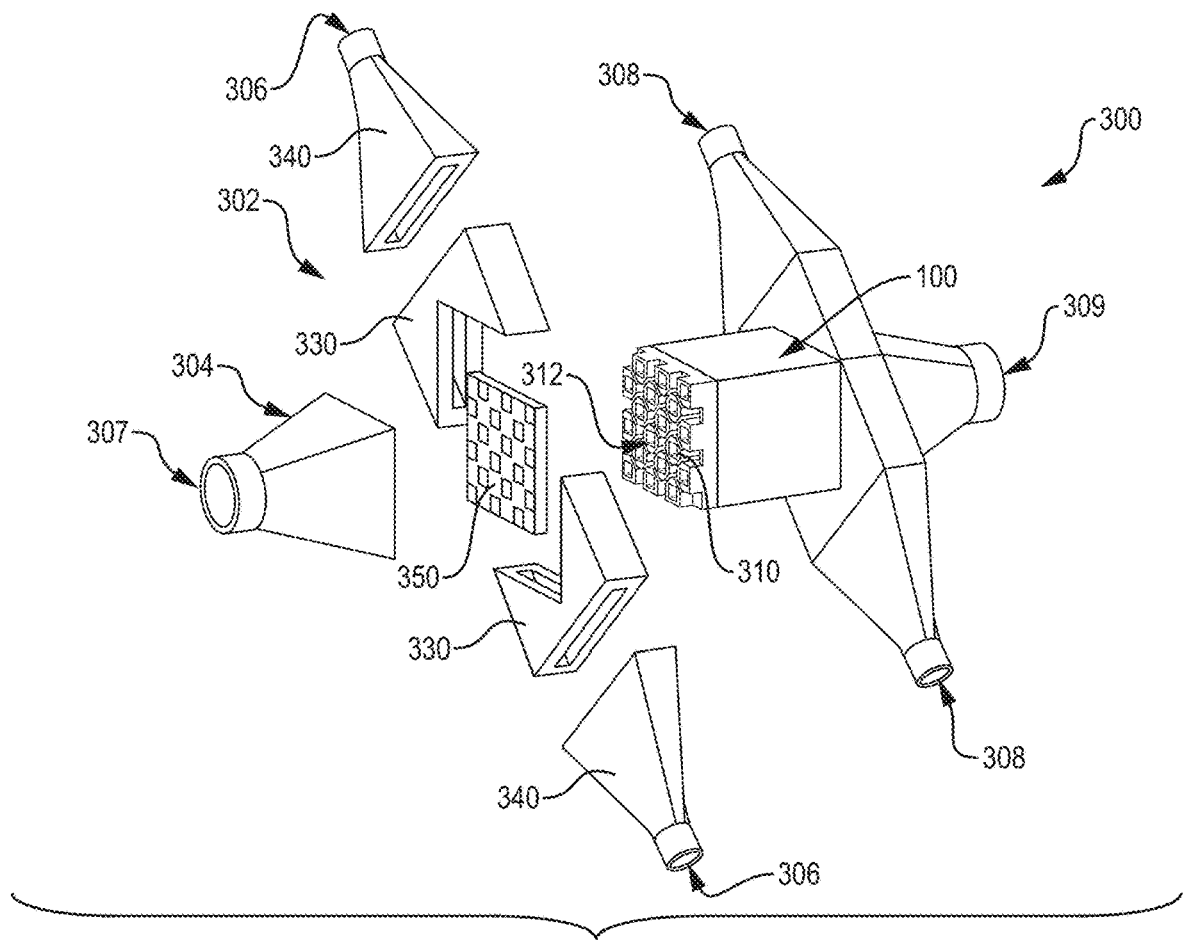
FIG. 4 is an exploded view of an exemplary embodiment of a heat exchanger having an air header component and an $sCO_2$ header component coupled thereto.

FIG. 4 illustrates an exemplary embodiment of the header 300 for the compact, checkerboard-patterned heat exchanger of the present embodiments (e.g., the heat exchanger 100, among others provided for herein or otherwise derivable from the present disclosures). The header 300 can integrate with the heat exchanger to connect all individual hot and cold streams into a single stream that can be integrated with its respective inlet/outlet. The header 300 is capable of efficient flow distribution into and out of checkerboard-patterned compact heat exchangers of the present embodiments, although the present disclosures provided for herein can enable other header configurations that can be used in conjunction with alternative designs of heat exchangers.

As shown, the header 300 can include two distinct sub-systems: a supercritical $CO_2$ ($sCO_2$) header component 302 and an air header component 304. The $sCO_2$ header component 302 can include a cold inlet 306 and cold outlet 308 that runs cold fluid substantially perpendicular to the heat exchanger 100. The air header component 304 can include a hot inlet 307 and a hot outlet 309 that runs hot fluid substantially parallel to the flow within the heat exchanger 100, as shown in FIG. 4. A person of ordinary skill in the art will recognize that the header 300 can be symmetrically disposed on opposite sides of the heat exchanger 100 as shown, and, in some embodiments, the reference to the inlets 306, 307 and outlets 308, 309 of the components 302, 304 can be reversed.

The $sCO_2$ header component 302 can include a flow distribution component 310. The flow distribution component 310 can include a series of openings 312 formed or otherwise disposed therein for receiving the cold fluid and/or the hot fluid from the $sCO_2$ header component 302 and the air header component 304. The openings 312 of the flow distribution component 310 can be dedicated to a particular working fluid such that a portion, e.g., one or more, of the series of openings can allow a cold working fluid to flow therethrough and another portion of the series of openings can allow a hot working fluid to flow therethrough. In some embodiments, approximately half of the openings 312 flow cold working fluid therethrough and approximately half of the openings 312 flow hot working fluid therethrough. The openings 312 of the flow distribution component 310 can be connected to the macrochannels 102 of the core 100 such that the inlets and outlets are superimposed over the macrochannels. The openings 312 can permit flow into macrochannels 102 of the heat exchanger, which, in turn, can flow water (or other fluid) through the microchannels thereof. In embodiments involving high temperature applications, water may not flow through the microchannels.

The inlets 306 and outlets 308 can be geometrically designed to minimize mass maldistribution. As shown, cold working fluid can enter through two inlets 306 and travel through eighteen openings 312, each one corresponding to a cold channel in the core 100, prior to flowing out of the outlet 308. This type of design choice is more clearly illustrated in later embodiments, such as those illustrated in FIGS. 5A-6B. Further, a person skilled in the art will recognize that two inlets 306 and eighteen openings 312 in the flow distribution component 310 is purely exemplary, and a ratio of the inlets to the openings 312 can be optimized based, at least in part, on the material of the header, material of the heat exchanger, or both, among other features that may impact the design that would be readily understood by a person skilled in the art in view of the present disclosures. Within the $sCO_2$ header component 302, the fluid can interact with a complex flow distribution geometry, and the inlets and outlets can be disposed substantially perpendicular to the openings 312. As a result, flow maldistribution and pressure drop within the $sCO_2$ header component 302 can occur. There are at least two possible designs for the feature that interacts with cold fluid on either side of the core 100, depending, at least in part, on manufacturing capabilities.

The header 300 can be made from a variety of materials. For example, the header can be based on a silicon carbide material choice for use in a $sCO_2$ Brayton cycle, though a person skilled in the art will recognize that other materials can be used. Headers that work optimally with the MPHT ceramic heat exchanger of the present embodiments include brittle materials such as silicon carbide, other silica such as fused silica, metal alloys, higher-strength $Si_3N_4$, lower density $B_4C$, carbon nanocomposites, other ceramic materials, and so forth. It will be appreciated that the presently disclosed header design is optimized for a ceramic heat exchanger of the present embodiments. That is, more optimal header designs exist, but such designs would negatively impact performance of the instantly disclosed MPHT ceramic heat exchanger.

Figure 5A:
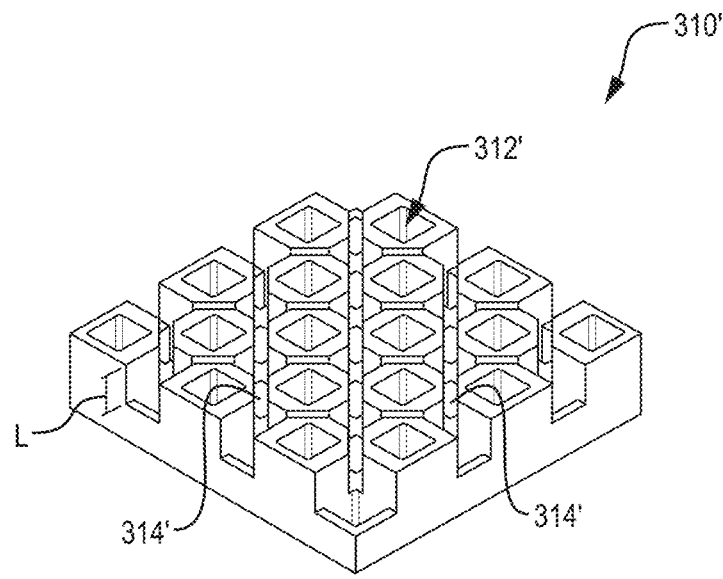
FIG. 5A is a perspective view of an exemplary embodiment of a machined component for flow distribution and recombination.
Figure 5B:
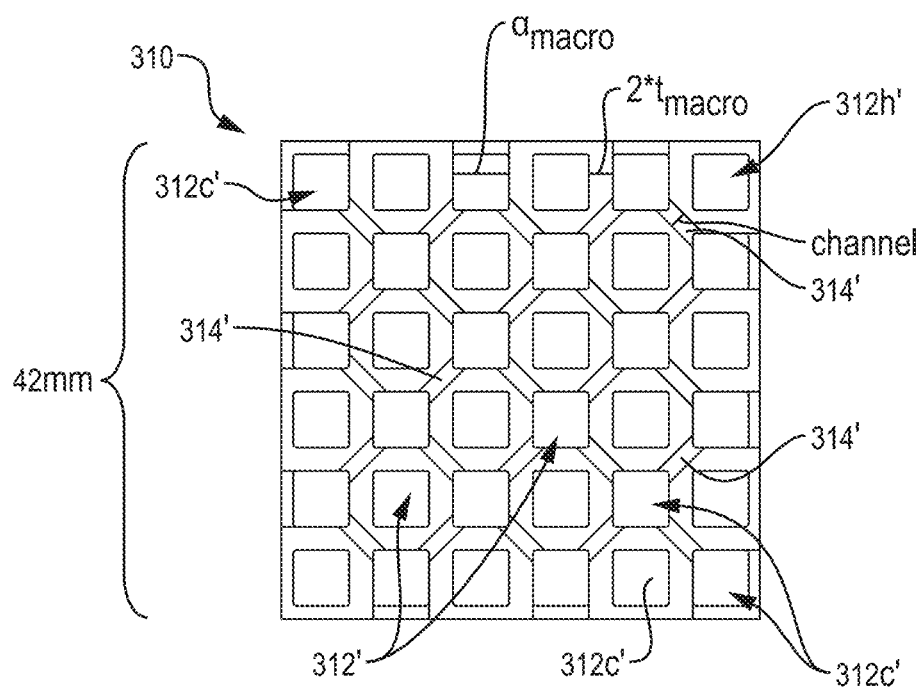
FIG. 5B is a top view of the machined component for flow distribution and recombination of FIG. 5A.
Figure 6A:
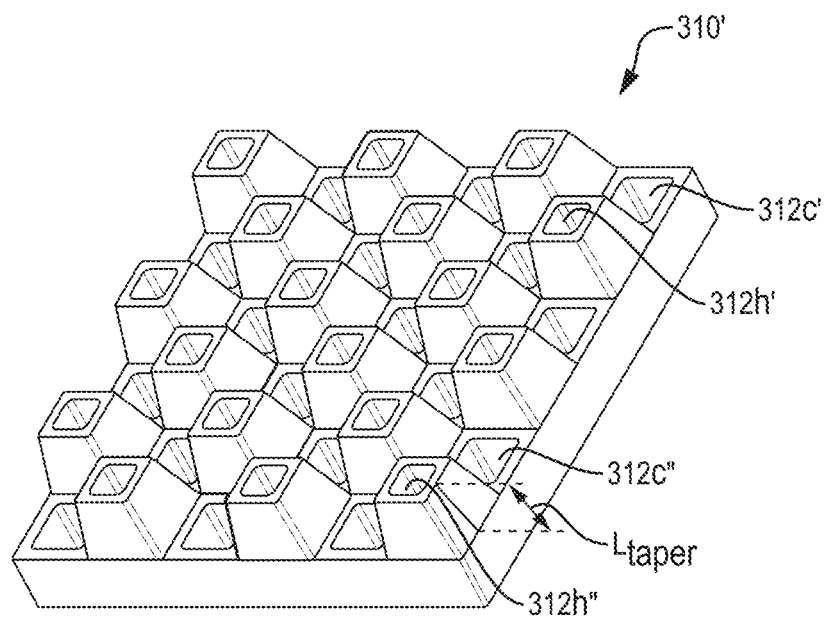
FIG. 6A is a perspective view of an exemplary embodiment of an injection molded component for flow distribution and recombination.
Figure 6B:
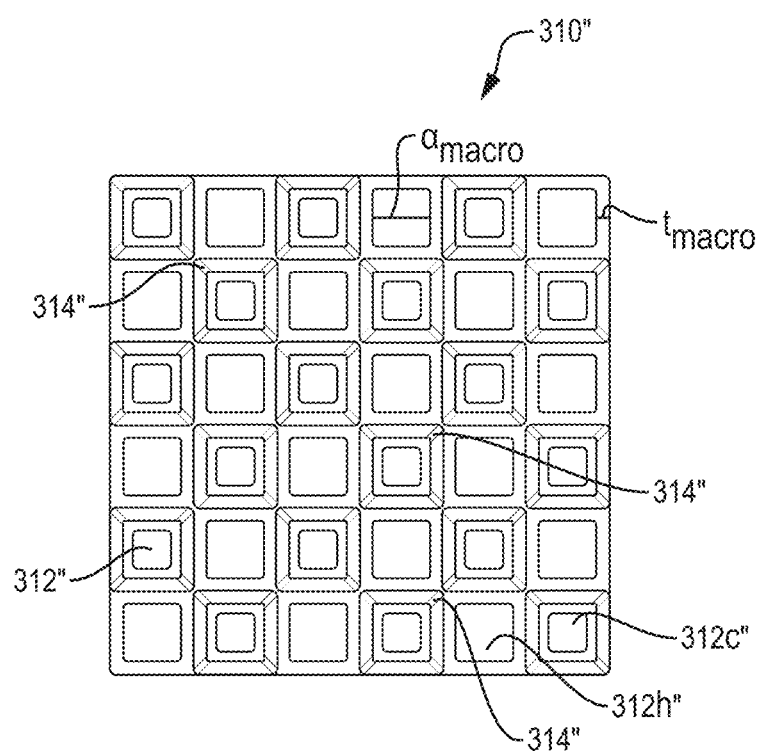
FIG. 6B is a top view of the injection molded component for flow distribution and recombination of FIG. 6A.

FIGS. 5A and 5B illustrate a machined flow distribution component 310', while FIGS. 6A and 6B illustrate an injection molded flow distribution component 310". The injection molded portion allows for a larger effective area for the path of the cold fluid, due, at least in part, to the tapered sides, resulting in a more even flow distribution and lower pressure drop as compared to the machined part. A machined approach for manufacturing the header 300 can have a smaller cross-sectional area than the injection molded portion, constricting the $sCO_2$ flow and resulting in both a larger pressure drop and a more variable mass distribution. Machining can simplify the construction of the header and can be achieved with a CNC machine regardless of material. Both can be rotated approximately 45° with respect to the inlet plane to increase flow distribution without adding build complexity.

Parameters $a_{macro}$ and $t_{macro}$ are defined in at least one embodiment as 5 mm and 1 mm respectively, based on heat exchanger core optimization. Depth L of the flow component 310', 310" shown in FIGS. 5A-6B can be tool limited to about 5 mm for common micro-mill bits. Further, in some embodiments, increasing L may not lead to significant reduction in pressure drop or mass maldistribution and only serves to reduce mass/volumetric power density of the overall heat exchanger. The width parameter of the openings 312' can be optimized to about 1.5 mm, wide enough to provide a low pressure drop and adequate mass distribution while small enough to not significantly impact the structural strength of the component. As noted above, the flow distribution components 310', 310" can be made from silicon carbide (SiC), among other materials.

Moreover, as shown above in FIG. 4, cold working fluid from the $sCO_2$ header component 302 can enter through the inlet 306 at an approximately 90-degree out of plane angle with respect to the openings 312 in the flow distribution component 310, while hot working fluid can enter through the inlet 307 in the air header component 304 linearly, e.g., at an angle of approximately 0 degrees, or parallel, with respect to the openings 312 in the flow distribution component 310. As a result, the working fluid that flows from the air header component 304 can be momentum driven and does not change directions throughout its linear flow through the heat exchanger 100, while flow of the cold working fluid cannot be momentum driven and can change direction of approximately 90 degrees when flowing through the heat exchanger 100. The flow distribution component 310 can include one or more branching features formed or otherwise disposed therein to facilitate distribution of the cold working fluid throughout the flow distribution component 310 to prevent stagnation of the working fluid at the entrance to the flow distribution component 310.

As shown, the branching features of the flow distribution component 310', 310" can include one or more channels 314', 314" therein. The channels 314' can be oriented substantially perpendicular to the openings 312' in the flow distribution component 310'. The channels 314' can connect between diagonally oriented openings 312' to establish a fluid communication between these openings to permit the cold working fluid to pass therebetween. For example, as shown in FIG. 5B, one or more of the openings 312' of the flow distribution component 310' can include a cold opening 312c'. The cold opening 312c' can be connected to another cold opening 312c' via channel 314', which in turn can be connected to other cold openings 312c' via additional channels 314' that branch throughout the flow distribution component 310' to allow the working fluid to disperse throughout the flow distribution component 310'. Once sufficiently distributed throughout, the cold working fluid can flow through the cold openings 312c' and into the heat exchanger 100. A person skilled in the art will recognize that the channels 314' connect the cold openings 312c' and not the hot openings 312h' to at least allow the hot openings 312h' to be dedicated to hot working fluid for efficient operation of the heat exchanger 100 and to minimize the pressure drop across the header and the heat exchanger. A detailed version of the channels is shown in FIGS. 5B and 6B. It will be appreciated that the channels 314" serve a substantially similar purpose between the cold channels 312c" for the injection molded flow distribution component 310" in FIGS. 6A-6B.

Figure 7A:
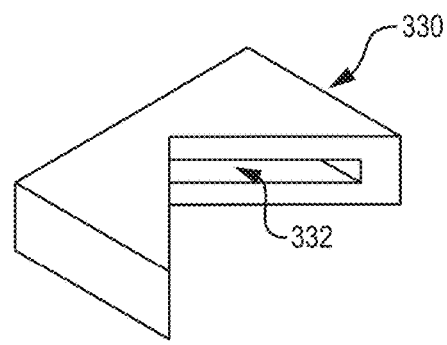
FIG. 7A is a perspective view of a connector of the header component of FIG. 4.
Figure 7B:
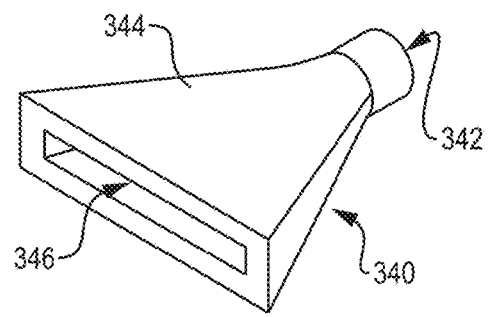
FIG. 7B is a perspective view of a cycle adaptor of the header component of FIG. 4.
Figure 7C:
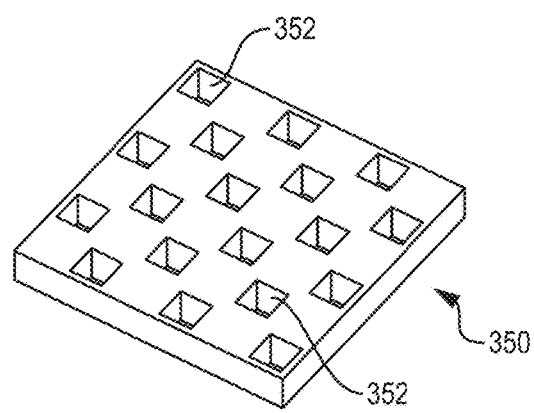
FIG. 7C is a perspective view of a blocker plate of the header component of FIG. 4.

All additional components of the header 300 can be manufactured via several processes, including injection molding and machining. For example, as shown in FIG. 4, the $sCO_2$ header component 302 can include a connector 330, a cycle adaptor 340, and a blocker plate 350, which are shown in greater detail in FIGS. 7A-7C. As shown, the blocker plate 350 can be received in a pair of the connectors 330 such that the blocker plate is in fluid communication therewith. For example, the connector 330 can have a recess therein for receiving the blocker plate 350 such that the blocker plate is substantially encompassed within the connector. Moreover, one or more cycle adaptors 340 can be in fluid communication with the blocker plate 350 through the connector 330. While the connector 330, the cycle adaptor 340, and the blocker plate 350 are shown as separate components, one skilled in the art will recognize that two or more of these components can be integratedly manufactured as a unitary header component 302.

Figure 9:
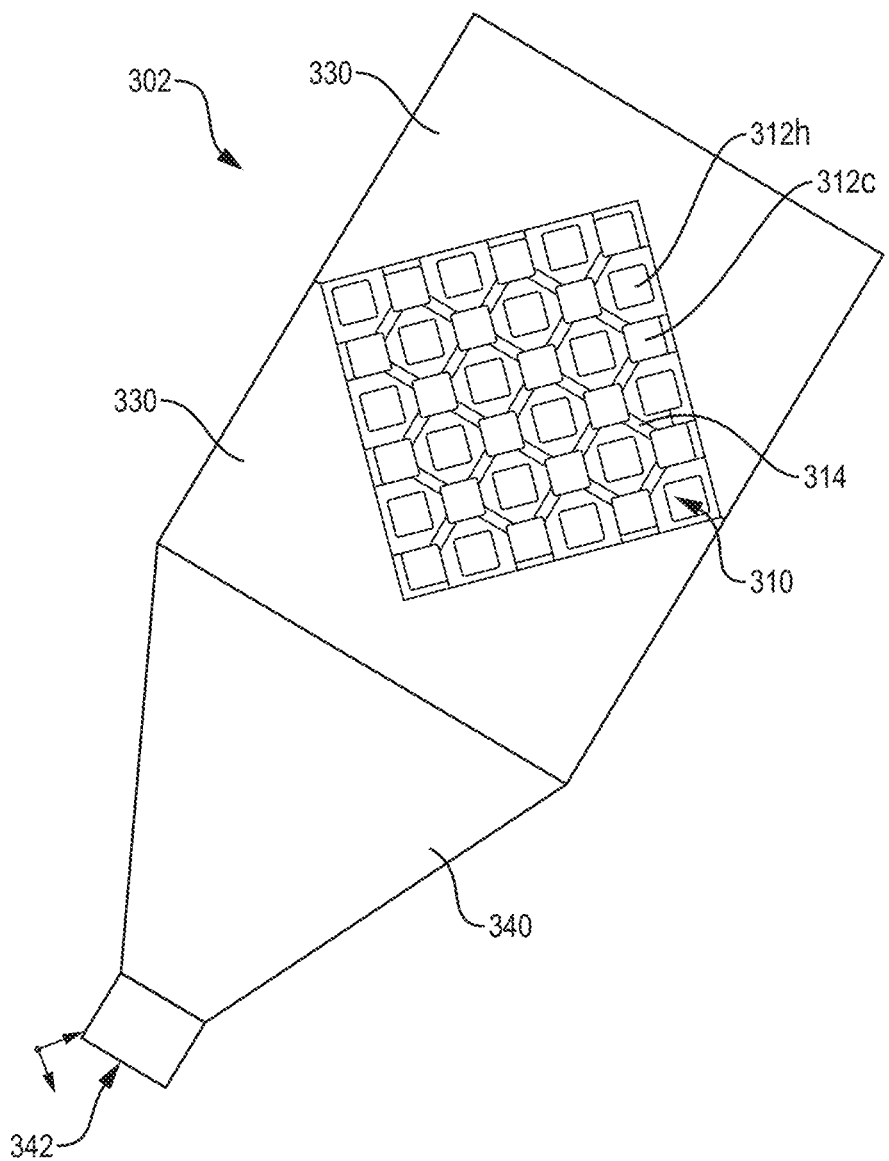
FIG. 9 is a top view of a cohesive header system that includes the connector, the cycle adaptor, and the blocker plate of FIGS. 7A-7C coupled together.

As noted above, the blocker plate 350 can be received within a pair of connectors 330 that can couple to inlets 342 of a pair of cycle adaptors 340. The connectors 330 can serve as a housing configured to receive the blocker plate 350 therein. For example, as shown, each connector 330 can include a V-shaped cutout that defines an opening 332 sized to receive the blocking plate 350 therein. The opening 332 can pass through the connector 330 such that the blocking plate 350 can be disposed in two connectors on opposite sides of the plate as shown in FIG. 4 and FIG. 9. While a size of the connectors 330 can vary, an exemplary embodiment of the connector 330 can measure approximately 62 millimeters×approximately 40 millimeters×approximately 15 millimeters in length, width, and height, respectively. Moreover, while a size of the blocking plate 350 can vary, an exemplary embodiment of the blocking plate 350 can measure approximately 42 millimeters×approximately 42 millimeters×approximately 5 millimeters in length, width, and height, respectively to allow the blocker plate to pass through, and remain disposed within, the opening 332.

The cycle adaptors 340 can couple to the connector 330 on an opposite side of the opening 332 from the connector 330. This can allow cold working fluid to flow from the inlet 342, through the connector 330, and across the blocker plate 350. For example, the cycle adaptor 340 can include a funnel shaped body 344 that extends from the inlet 342 to an opening 346. The opening 346 can be configured to receive and/or otherwise couple to the connector to substantially seal any gaps to avoid loss of fluid flow through the inlet 342 towards the blocker plate 350. While a size of the cycle adaptors 340 can vary, an exemplary embodiment of the cycle adaptors 340 can measure approximately 62 millimeters×approximately 15 millimeters in length and height, respectively.

A person skilled in the art will recognize that the blocker plate 350 facilitates regulation of flow of cold working fluid and hot working fluid through the header 300 and into the heat exchanger 100. For example, the blocker plate 350 can include one or more openings 352 therein that are configured to be disposed over the openings 312 in the flow distribution component 310. As shown and discussed with respect to FIG. 7C, the number of openings 352 in the blocker plate 350 can be substantially half of the openings 312 in the flow distribution component 310 such that flow of fluid through substantially half of the openings 312 is blocked.

Figure 8:
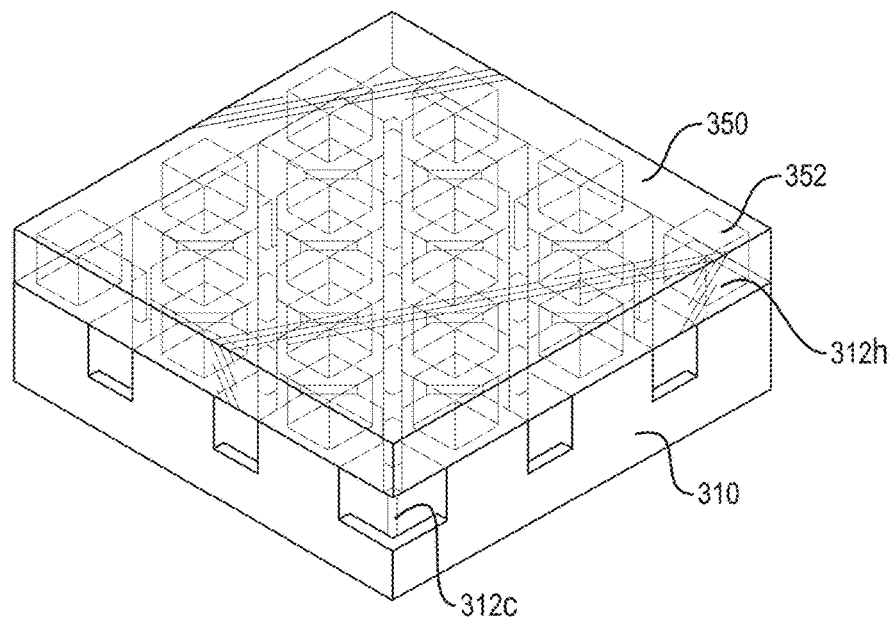
FIG. 8 is a perspective view of the blocker plate of FIG. 7C and a flow distribution component of the sCO$_2$ header component of FIG. 4 coupled together.

FIG. 8 illustrates the coupling between the blocker plate 350 and the flow distribution component 310 in greater detail. As shown, the openings 352 of the blocker plate 352 can align with the hot openings 312h to facilitate flow of hot working fluid through the flow distribution component 310 while blocking the cold openings 312c to prevent hot working fluid from flowing therethrough. In this way, the blocker plate 350 can maintain peak performance of the heat exchanger by ensuring that the cold openings 312c are dedicated to cold working fluid.

Fabrication of the header or manifold 300 can include scalable injection molding to mate to the internal structure of the heat exchanger 100. As shown, the manifold 300 can have an open internal structure to direct the flow of the two fluids, and can be co-sintered to the heat exchanger to bond it thereto.

Creation of the open internal structure of the manifold can be performed, for example, using injection molding (IM). Injection molding can include preparation of water-based highly-loaded (>50 vol. %) suspensions of ceramic powder, all of which can be flowable at room temperature. The rheology of these ceramic loaded suspensions can be specifically designed to possess a yield stress and to be shear thinning, which can provide necessary strength and allow suspension flowability for forming. Unlike prior work, all injection molding can be performed at room temperature and low pressures because the suspension can be designed to flow once the yield strength of the suspension is overcome. The molds for injection can be made of polymer, instead of metal, among other materials, and/or 3D-printed using an inexpensive stereolithography printer, among other printing techniques. Incorporating these materials into the manifold design can allow transformation of these materials into the necessary molds for injection in one day or less, affording rapid integration between design and fabrication.

Process selection can be highly dependent on material selection and manufacturing parameter definitions. The SiC components can be fabricated via injection molding and/or machining in the "green state," then sintered or otherwise coupled together to form one cohesive header system, as shown in FIG. 9. It will be appreciated that changing the dimensions of the design can change the flow distribution and/or increase the pressure drop, which can have deleterious effects on heat exchanger performance.

Figure 10:
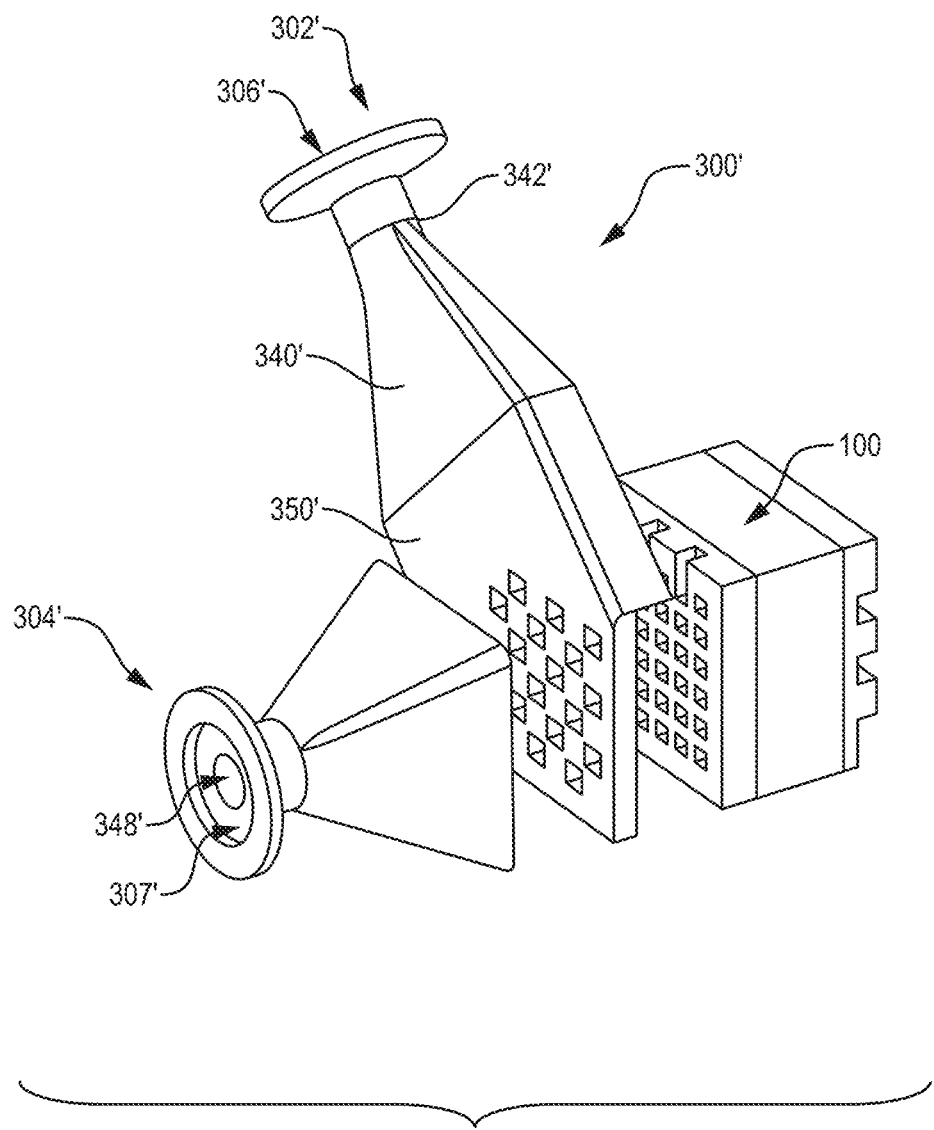
FIG. 10 is an exploded view of another embodiment of a heat exchanger having an air header component and an sCO$_2$ header component coupled thereto.

FIG. 10 illustrates another exemplary embodiment of a header 300' having a supercritical $CO_2$ ($sCO_2$) header component 302' and an air header component 304'. As shown, the header 300' can include an enlarged cold inlet 306' of the $sCO_2$ header component 302' and an enlarged hot inlet 30T of the air header component 304' to facilitate coupling to $sCO_2$ and air sources. In some embodiments, the enlarged inlets 306', 307' can include one or more ports 348' in fluid communication with an alternative design of a cohesive header system that can include a cycle adaptor 340' and a blocking plate 350' coupled together. For example, the enlarged inlet 306' can be in fluid communication with the inlet 342' of the cycle adaptor 340' to allow cold working fluid to flow towards a blocker plate 350'. In some embodiments, the $sCO_2$ header component 302' can be integratedly manufactured as a unitary component. Moreover, in some embodiments, one or more of the $sCO_2$ header component 302' and the air header component 304' can be made with a slip casting process.

Figure 11:
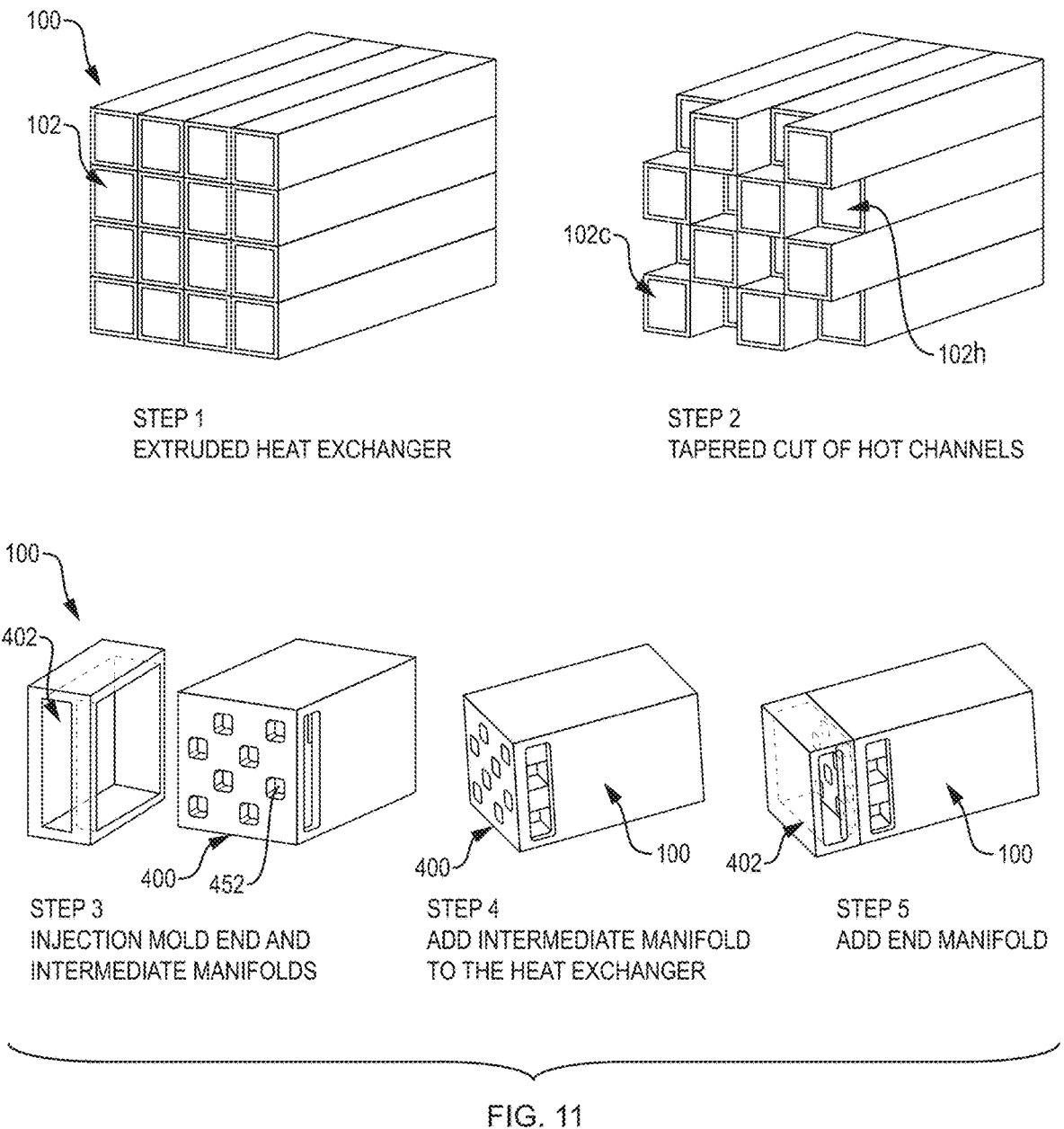
FIG. 11 is a schematic perspective view of one exemplary embodiment of a fabrication procedure of manifolds associated with a heat exchanger.

FIG. 11 illustrates a breakout view of a heat exchanger 100, along with the design of two manifolds 400, 402 for integration with the heat exchanger to direct fluid flow. Beginning with the extruded heat exchanger 100, channels that carry hot air 102*h* can be cut away, leaving behind an array of approximately 5 mm long channels, e.g., cold macrochannels 102*c*, that can carry $sCO_2$. One of the manifolds, which can be identified as an intermediate manifold 400, can have an array of substantially square holes 452 that match with the extended approximately 5 mm channels 102*c*, similar to the configuration illustrated in FIG. 4, along with an open side for hot air entry. The other manifold 402, which can be identified as an end manifold, can be simpler in design, with only one open side in what can otherwise have an open box shape. Each manifold 400, 402 can be formed, for example, by way of injection molding by first forming the mold in an available printer, such as a Formlabs 2 printer from Formlabs Inc. of Somerville, Mass.

The header 400, 402 can integrate with the heat exchanger 100, for example, via a co-sintering approach for the densification of the two components, and the attachment of the intermediate 400 and end headers 402 to the heat exchanger 100. By combining densification and attachment in one sintering step, the number of furnace cycles used to fabricate the design can be reduced. This approach can be more scalable and can consider the manufacturability throughout the heat exchanger development process.

Delamination and/or cracking between the strong, dense walls and the porous channels made from the same ceramic can be prevented during integration due, at least in part, to the (1) the presence of dense walls that constrain densification of the porous channels, and/or (2) the symmetry of the channel design that can prevent excess strain and resulting stresses. Further, making adjustments to the ceramic powder loading in the manifold can cause the rate of sintering to be increased or decreased to match that of the heat exchanger, and thus avoid residual stress development due to differential shrinkage rates.

For the co-sintering approach, parts can be made by two different processing methods prior to the sintering approach discussed above. The manifolds 300, which can be made via IM, and the heat exchanger 100, which can be made via co-extrusion, can be placed in contact during heating to develop a desirable strong bond between the two parts. Attaching these two parts prior to sintering can include burnout of the polymer in both the manifolds and the heat exchanger by heating each part to approximately 500° C. in air (the residual powders can maintain their shape). The intermediate manifold can be attached to the heat exchanger using the same or similar process used to join adjacent pieces in a toilet bowl prior to sintering—preparing a viscous slip (ceramic powder and water with a consistency of honey) and, using a syringe, placing a bead of the slip between the two pieces to be joined. In a similar fashion, the end manifold can be attached to the intermediate manifold using the SiC slip. Upon sintering, the desired strong bond can form between the three components. In some embodiments, reaction bonding can be used to attach the components.

Performance Data and Examples

Maximum stress values can occur at the corners of the macrochannels. Filleted corners on the length scale of expected grain size (~5 μm) allow for an average maximum stress value to be repeatably obtained. Overall, the maximum stress experienced by the heat exchanger core can be dominated by the porosity of an interior macrochannel, and not the wall thickness, especially when porosity rises above approximately 50%. The porous structure can mitigate the stringent structural requirement on wall thickness by, for example, reducing the dependency of the stress profile on wall thickness, thus significantly reducing the volume and enhancing the power density of the heat exchanger. It will be appreciated that although macrochannel wall thickness can have a negligible effect on the overall heat transfer between fluids, thicker walls can reduce the cross-sectional area for the flows, can demand a higher flow velocity, and can decrease the overall thermal performance. Currently max $1^{st}$ principal stress values are approximately 200 MPa, given a porosity of about 50% and a wall thickness of about 1 mm, leading to a safety factor against SiC fast fracture of approximately 2.5. One non-limiting embodiment of a small heat exchanger demonstration unit formed in view of the present disclosures is identified in Table 2 below:

TABLE 2

Metrics for an advanced heat exchanger demonstration unit.

| Heat Exchanger Metric | Description, rationale, and additional remarks where appropriate |
|---|---|
| Targeted application(s) | Airplane auxiliary power unit |
| Hot-side Inlet temperature [° C.] | 1285 |
| Hot-side Inlet pressure [bar] | 80 |
| Cold-side Inlet Temperature [° C.] | 300 |
| Cold-side inlet pressure [bar] | 250 |
| Hot-side pressure drop, $(\Delta P/P_{inlet})_{hot}$, expressed in % | <4% |
| Cold-side pressure drop, $(\Delta P/P_{inlet})_{cold}$, expressed in % | <0.2% |
| Hot-side flow rate [kg/sec] | 0.08 |
| Cold-side flow rate [kg/sec] | 0.08 |
| Effectiveness, expressed in % | 50 |
| Thermal duty (capacity) | 50 |
| Heat exchanger mass-based power density [kW/kg] | 300 |
| Heat exchanger volume-based power density [kW/m$^3$] | $7.1 \times 10^5$ |
| Material(s) | SiC |
| Working fluid | sCO$_2$ (cold stream), Air (hot stream) |
| Manufacturing technique(s) | Ceramic co-extrusion |

Heat transfer performance or effectiveness of the heat exchanger can increase as heat exchanger length increases, while the pressure drop penalty can also increase. Overall, the MPHT HX can achieve a mass-based power density of approximately 300 kW/kg and a volume-based power density of approximately 710 MW/m$^3$ (Table 2), which is more than an order of magnitude higher than existing aircraft heat exchangers due to the ability to operate at a temperature difference of up to 1000° C. between the hot and cold streams that is enabled by the present disclosure.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety Some non-limiting claims that are supported by the contents of the present disclosure are provided below.

What is claimed is:

1. A heat exchanger, comprising:
   a plurality of macrochannels;
   a two-dimensional microchannel array disposed within each macrochannel of the plurality of macrochannels, the two-dimensional microchannel array being configured to allow a first working fluid to flow therethrough and through the respective macrochannel, and
   a header comprising:
      a first header component having at least a first inlet and a first outlet;
      a second header component having at least a second inlet and a second outlet;
      a flow distribution component configured to mount to the heat exchanger, the flow distribution component including a plurality of openings configured to receive at least one of the first working fluid or the second working fluid therethrough;
      a blocker plate configured to selectively block a first portion of the plurality of openings of the flow distribution component while selectively allowing fluid to flow through a second portion of the plurality of openings of the flow distribution component;
      a plurality of connectors coupled to the blocker plate, the blocker plate being disposed between the plurality of connectors; and
      at least one cycle adaptor coupled to a connector of the plurality of connectors, the at least one cycle adaptor being in a fluid communication with the flow distribution component via the blocker plate and the connector of the plurality of connectors,
   wherein each macrochannel of the plurality of macrochannels has one or more adjacent macrochannels of the plurality of macrochannels, each of which has the respective two-dimensional microchannel array disposed in it, and the respective two-dimensional microchannel array being configured to allow a second working fluid to flow therethrough in an equal and opposite direction to the first working fluid,
   wherein the heat exchanger is configured such that a temperature of the first working fluid is higher than a temperature of the second working fluid,
   wherein the first inlet is configured to receive the first working fluid and pass the first working fluid through the at least one cycle adaptor to the first portion of the plurality of openings and the first outlet,
   wherein the second inlet is configured to receive the second working fluid and pass the second working fluid through the at least one cycle adaptor to the second portion of the plurality of openings and the second outlet, and
   wherein each of the flow distribution component, the blocker plate, the plurality of connectors, and the at least one cycle adaptor comprise a high-thermal conductivity ceramic.

2. The heat exchanger of claim 1, wherein the plurality of macrochannels are arranged in a checkerboard pattern.

3. The heat exchanger of claim 1, wherein the working fluid flowing through the macrochannels is in a gaseous form.

4. The heat exchanger of claim 1, wherein the first working fluid differs in composition from the second working fluid.

5. The heat exchanger of claim 1, wherein each microchannel in the two-dimensional microchannel array is disposed in a substantially straight line through each respective macrochannel of the plurality of macrochannels.

6. The heat exchanger of claim 1, wherein the heat exchanger comprises a high-thermal conductivity ceramic.

7. The heat exchanger of claim 6, wherein the high-thermal conductivity ceramic comprises silicon carbide.

8. The heat exchanger of claim 1, wherein the two-dimensional microchannel array through which the second working fluid flows is configured to have a lower temperature at a center of the array than at an outer portion of the array as the second working fluid flows therethrough.

9. The heat exchanger of claim 1, wherein the two-dimensional microchannel array through which the second working fluid flows is configured to have a decreasing temperature gradient from an outer surface to a center thereof as the second working fluid flows therethrough.

10. The heat exchanger of claim 1, wherein the two-dimensional microchannel array through which the first working fluid flows is configured to have an increasing temperature gradient from an outer surface to a center thereof as the first working fluid flows therethrough.

11. The heat exchanger of claim 1, wherein at least one opening of the plurality of openings includes a tapered surface that extends from a surface of the flow distribution component such that one of the first working fluid and the second working fluid flowing therethrough contacts the surface across a larger area than another outlet of the respective plurality of first and second outlets.

12. The heat exchanger of claim 1, further comprising one or more channels disposed between the first portion of openings.

13. The heat exchanger of claim 12, wherein the one or more channels are disposed at a substantially perpendicular angle with respect to the first portion of openings.

14. The heat exchanger of claim 12, wherein the first working fluid is configured to pass through the one or more channels to distribute the working fluid throughout the first portion of openings prior to passing through the first portion of openings.

15. The heat exchanger of claim 1, wherein the header is configured such that the first working fluid flowing through the first inlet flows at approximately a 90-degree out of plane angle with respect to the first portion of openings.

16. The heat exchanger of claim 1, wherein the header is configured such that the second working fluid flowing through the second inlet flows substantially parallel to the heat exchanger.

17. The heat exchanger of claim 1, wherein the header is symmetric about opposite sides of the heat exchanger.

18. The heat exchanger of claim 1, wherein each of the plurality of openings is disposed over a macrochannel in the heat exchanger.

19. The heat exchanger of claim 1, wherein the second header component comprises an air header component disposed over at least a portion of the blocker plate and coupled to at least one of blocker plate and the plurality of connectors.

20. A heat exchanger, comprising:
a plurality of macrochannels; and
a two-dimensional microchannel array disposed within each macrochannel of the plurality of macrochannels, the two-dimensional microchannel array being configured to allow a first working fluid to flow therethrough and through the respective macrochannel,
wherein each macrochannel of the plurality of macrochannels has one or more adjacent macrochannels of the plurality of macrochannels, each of which has the respective two-dimensional microchannel array disposed in it, and the respective two-dimensional microchannel array being configured to allow a second working fluid to flow therethrough in an equal and opposite direction to the first working fluid,
wherein the heat exchanger is configured such that a temperature of the first working fluid is higher than a temperature of the second working fluid, and
wherein the two-dimensional microchannel array through which the second working fluid flows is configured to have a lower temperature at a center of the array than at an outer portion of the array as the second working fluid flows therethrough.

21. A heat exchanger, comprising:
a plurality of macrochannels; and
a two-dimensional microchannel array disposed within each macrochannel of the plurality of macrochannels, the two-dimensional microchannel array being configured to allow a first working fluid to flow therethrough and through the respective macrochannel,
wherein each macrochannel of the plurality of macrochannels has one or more adjacent macrochannels of the plurality of macrochannels, each of which has the respective two-dimensional microchannel array disposed in it, and the respective two-dimensional microchannel array being configured to allow a second working fluid to flow therethrough in an equal and opposite direction to the first working fluid,
wherein the heat exchanger is configured such that a temperature of the first working fluid is higher than a temperature of the second working fluid, and
wherein the two-dimensional microchannel array through which the second working fluid flows is configured to have a decreasing temperature gradient from an outer surface to a center thereof as the second working fluid flows therethrough, or
wherein the two-dimensional microchannel array through which the first working fluid flows is configured to have an increasing temperature gradient from an outer surface to a center thereof as the first working fluid flows therethrough.

* * * * *